(12) United States Patent
Kato et al.

(10) Patent No.: US 7,905,312 B2
(45) Date of Patent: Mar. 15, 2011

(54) DRIVING FORCE TRANSMITTING DEVICE FOR FOUR-WHEEL DRIVE VEHICLE

(75) Inventors: Tadahiko Kato, Kosai (JP); Satoru Suzuki, Kosai (JP)

(73) Assignee: Univance Corporation, Shizuoka (JP)

( * ) Notice: Subject to any disclaimer, the term of this patent is extended or adjusted under 35 U.S.C. 154(b) by 74 days.

(21) Appl. No.: 12/382,164

(22) Filed: Mar. 10, 2009

(65) Prior Publication Data
US 2009/0229905 A1 Sep. 17, 2009

(30) Foreign Application Priority Data

Mar. 13, 2008 (JP) ................................ 2008-063902

(51) Int. Cl.
*B60K 17/35* (2006.01)
(52) U.S. Cl. ....................................... 180/249; 180/245
(58) Field of Classification Search .................. 180/245, 180/249, 248
See application file for complete search history.

(56) References Cited

U.S. PATENT DOCUMENTS

| 5,058,700 | A  | * | 10/1991 | Shibahata ...................... 180/245 |
| 5,135,071 | A  | * | 8/1992 | Shibahata et al. ............. 180/249 |
| 6,907,953 | B2 | * | 6/2005 | Shigeta et al. ................. 180/248 |
| 7,383,910 | B2 | * | 6/2008 | Mori et al. ...................... 180/245 |
| 7,503,416 | B2 | * | 3/2009 | Sharma et al. ................. 180/247 |
| 7,610,982 | B2 | * | 11/2009 | Matsuno et al. .............. 180/245 |
| 2009/0211830 | A1 | * | 8/2009 | Kato et al. ...................... 180/244 |

FOREIGN PATENT DOCUMENTS

| JP | 08-091066 | 4/1996 |
| JP | 2001-206092 | 7/2001 |

* cited by examiner

*Primary Examiner* — Tony H. Winner
(74) *Attorney, Agent, or Firm* — Wenderoth, Lind & Ponack, L.L.P.

(57) ABSTRACT

A driving force transmission device for four-wheel-drive vehicle based on the two-wheel drive of front wheels is provided. In the case of the two-wheel drive of front wheels, a multi-disc clutch mechanism for controlling the driving force distribution to a rear wheel output shaft, and a disconnection/connection mechanism for disconnecting and connecting a rear wheel differential and a right rear wheel drive shaft are provided, and in the two-wheel drive of front wheels, the dragging torque of the multi-disc clutch mechanism is made smaller than the friction torque of a rear wheel driving force transmission section, and the front wheel differential and the right rear wheel drive shaft are disconnected by the disconnection/connection mechanism, thereby the rotation of the rear wheel driving force transmission section is stopped.

15 Claims, 22 Drawing Sheets

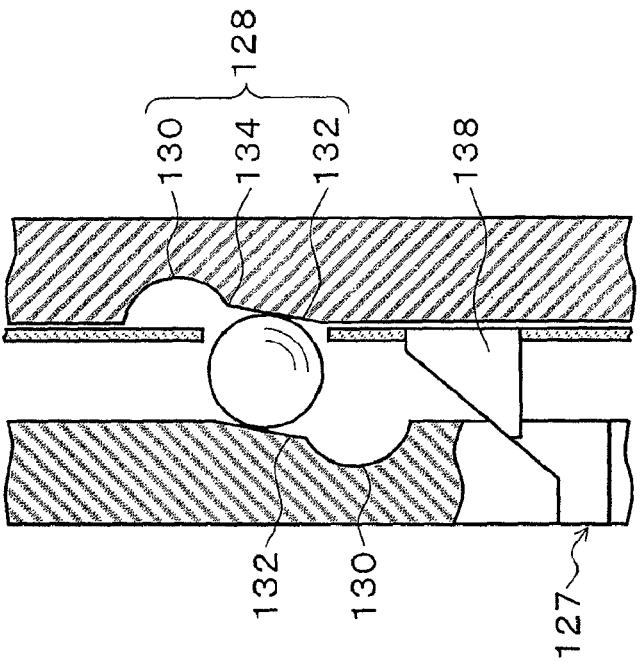
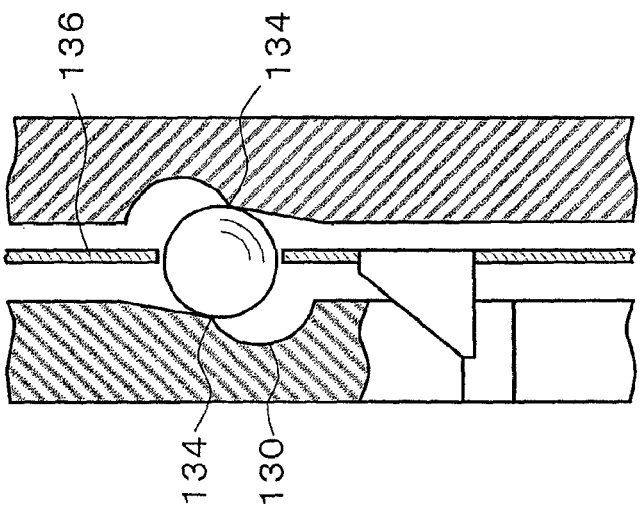
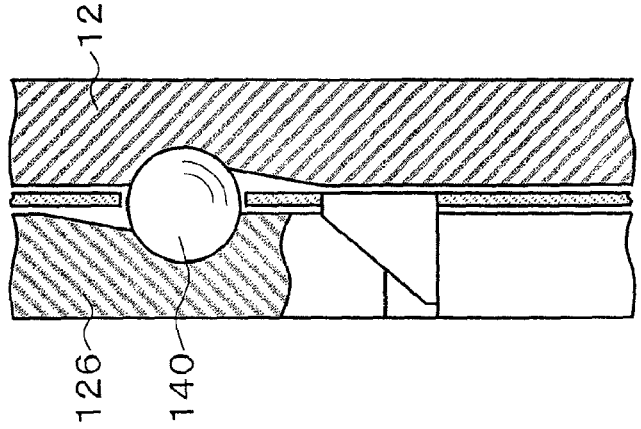

DRIVING FORCE TRANSMITTING DEVICE FOR FOUR-WHEEL DRIVE VEHICLE

This application is a priority based on prior application No. JP 2008-63902, filed Mar. 13, 2008, in Japan.

BACKGROUND OF THE INVENTION

1. Field of the Invention

The present invention relates to a driving force transmission device for four-wheel-drive vehicle based on the two-wheel drive of front wheels enabling to change a two-wheel drive and a four-wheel drive, more specifically, to a driving force transmission device for four-wheel-drive vehicle in which the rotation of the parts not operative for the transmission of the driving force in the two-wheel drive is stopped.

2. Description of the Related Arts

As one of driving force transmission devices for four-wheel-drive vehicle in which front wheels are driven in the two-wheel drive, and the distribution control of the driving force to the rear wheels is performed in the four-wheel drive by a multi-disc clutch mechanism, in the four-wheel-drive vehicle based on the two-wheel drive of conventional so-called on-demand type full-time front wheels, for example, the device shown in FIG. 1 is known.

FIG. 1 shows a driving force transmission device for four-wheel-drive vehicle based on the two-wheel drive of conventional so-called on-demand type full-time front wheels. In FIG. 3, a driving force transmission device 300 is provided in a four-wheel-drive vehicle 302, and the driving force from an engine 304 is changed by a gearbox 306 and input into a front wheel differential 308 and a driving force direction converting unit 310 in the driving force transmission device 300, and the output from the driving force direction converting unit 310 is transmitted to a multi-disc clutch mechanism 314 through a propeller shaft 312. When the multi-disc clutch mechanism 314 is released (disconnected) in the two-wheel drive, the driving force is not distributed to a rear wheel differential 324 but transmitted to the front wheel differential 308, and the front wheel differential 308 absorbs the rotation speed difference between a left front wheel 316 and a right front wheel 318, gives a same torque to the left front wheel 316 and the right front wheel 318, and makes the front wheels rotate. When the multi-disc clutch mechanism 314 is fastened (connected) in the four-wheel drive, the driving force is transmitted also to the rear wheel differential 324 through a drive pinion 320 connected to the multi-disc clutch mechanism 314 and a ring gear 322, and the rear wheel differential 324 absorbs the rotation speed difference between a left rear wheel 326 and a right rear wheel 328, gives a same torque to the left rear wheel 326 and the right rear wheel 328, and makes the rear wheels rotate. In general, in the on-demand type full-time four-wheel-drive vehicle, as the drive modes for the drivers to optionally select by switch operations, a two-wheel-drive mode, a four-wheel-drive auto mode, and a four-wheel-drive lock mode are prepared. The two-wheel-drive mode is the mode that is used in the two-wheel-drive state in which the multi-disc clutch mechanism 314 of the driving force transmission device 300 is released, and selected when to show the maximum running performance on dry pavement roads and the like on which the driving force by four wheels is not necessary for the best mileage. The four-wheel-drive auto mode is the mode in which various running vehicle states are detected by sensors, and the driving force distribution of the multi-disc clutch mechanism 314 to the front and rear wheels are automatically controlled at the most suitable state by an ECU (Electronic Control Unit) based on the detection signals of the sensor, and can be always selected regardless of road surface states. In this mode, the fastening power of the multi-disc clutch mechanism 314 is increased and/or decreased continually by an actuator, and the driving force distribution to the front and rear wheels is controlled between the two-wheel-drive state in which the driving force to the rear wheels is approximately zero and the maximum fastening power. The four-wheel-drive lock mode is the mode in which the fastening power of the multi-disc clutch mechanism 314 is retained at its maximum regardless of the vehicle states detected by the various sensors, and this mode is selected when to show running characteristics as the four-wheel drive on rough roads and the like at the maximum. However, in such a conventional driving force transmission device for four-wheel-drive vehicle based on the two-wheel drive of front wheels, even in the two-wheel-drive mode, since the driving force from the gearbox 306 makes a driving force direction converting unit 310, a propeller shaft 312 and the driving side (front wheel side) of the multi-disc clutch mechanism 314 rotates, and the left rear wheel 326 and the right rear wheel 328 and the rear wheel differential 324 are directly connected, the left rear wheel 326 and the right rear wheel 328 rotate, and consequently, the rear wheel differential 324, the drive pinion 320 and the driven side (rear wheel side) of the multi-disc clutch mechanism 314 also rotate. That is, even in the two-wheel drive in which the multi-disc clutch mechanism 314 is released and the driving force is not transmitted to the rear wheels, and even if the multi-disc clutch mechanism 314 is released completely, the respective structural elements in the rear wheel driving force transmission section 330 including the driving force direction converting unit 310, the propeller shaft 312, the multi-disc clutch mechanism 314, the drive pinion 320 and the rear wheel differential 324 rotate, and this leads to a mileage fall by stirring resistance of the oil in this section or friction loss of bearings, which has been still another problem in the prior art. Further, the multi-disc clutch mechanism 314 includes a plurality of clutch discs, and although these clutch discs are lubricated and cooled by oil, since the so-called dragging torque that occurs by the viscosity resistance of the oil arising from the rotation speed difference between the driving side and the driven side of the clutch discs and the friction loss by the contact between the clutch discs is larger than the friction torque of the drive pinion 320 and the rear wheel differential 324, even if the left rear wheel 326 and the right rear wheel 328 and the rear wheel differential 324 are disconnected, the drive pinion 320 and the rear wheel differential 324 are rotated by the multi-disc clutch mechanism 314, and this deteriorates the mileage, which has been yet another problem in the prior art. In order to decrease this dragging torque, if the supply of the oil to the multi-disc clutch mechanism 314 is stopped, or if the multi-disc clutch mechanism is used with an extremely reduced quantity of the oil, it is possible to decrease or eliminate the dragging torque that occurs by the viscosity resistance of the oil. However, there is a fear that the multi-disc clutch mechanism 314 may be seized if sufficient lubrication is not performed at the time of the driving force distribution control. Furthermore, as a method to ensure sufficient intervals among the respective clutch discs in the released state of the multi-disc clutch mechanism 314, a method is suggested in which a ring spring 332 formed in a wave shape in the circumferential direction as shown in FIG. 2 is put between adjacent clutch discs of the driving side or adjacent clutch discs of the driven side, however, according to this method, it is possible to ensure the sufficient intervals between the clutch discs of the driving side or the clutch discs of the driven side, but it is not possible to prevent the clutch discs of the driving side from contacting the clutch discs of the driven side. In the four-wheel-drive auto mode, the driving force is transmitted to the rear wheels 326 and 328, and even if the transmitted driving force is lowest, a loss larger than that at the time of the two-wheel-drive mode occurs in the rear wheel driving force transmission section 330, and consequently, the mileage becomes worse than that at the time of the two-wheel-drive mode. In this mode, the driving force distribution is automatically controlled at the most suitable state even if the driver does not perform any operation, however, in the driving condition that does not need the four-wheel drive such as running on dry pavement roads, when the driver forgets the switch change to the two-wheel-drive mode, the running is continues in a poor mileage state, which has been yet another problem in the prior art. In this case, by switching over the two-wheel-drive mode and the four-wheel-drive auto mode automatically depending on driving conditions, it is possible to improve the mileage regardless of the switch operation by the driver, but for that purpose, it is necessary to quickly change the two-wheel drive and the four-wheel drive. As another method to decrease the dragging torque of the multi-disc clutch mechanism 314, there may be a method in which the distance of the approach section shifting from the standby state at the time of the two-wheel drive to the fastening state at the time of the four-wheel drive of the multi-disc clutch mechanism 314, that is, the so-called end play, is made large, and the intervals among the respective clutch discs are ensured sufficiently in the state in which the multi-disc clutch mechanism 314 is released at the time of the two-wheel drive, thereby the clutch discs are prevented from contacting one another. However, when the end play is made large, it takes much time in changing the mode from the two-wheel drive to the four-wheel drive, which decreases the running performance.

SUMMARY OF THE INVENTION

According to the present invention is to provide a driving force transmission device for four-wheel-drive vehicle which is based on the two-wheel drive of front wheels, and does not sacrifice the change response from the two-wheel drive to the four-wheel drive, decreases the oil viscosity resistance and friction loss owing to the rotation of the rear wheel differential and the driving force distribution device in the two-wheel drive, and does not deteriorate the mileage.

According to an aspect of the present invention, there is provided a driving force transmission device for four-wheel-drive vehicle based on a two-wheel drive of front wheels, including:

a switch mechanism for switching between a four-wheel-drive mode in which the fastening power of a multi-disc clutch mechanism is changed continually and the driving force distribution to front and rear wheels is controlled automatically depending on running conditions, and a two-wheel-drive mode in which the multi-disc clutch mechanism is released and the driving force is transmitted to only the rear wheels;

a front wheel differential for inputting a driving force from a drive source and outputting the driving force to left and right front wheel drive shafts and the multi-disc clutch mechanism;

a propeller shaft for transmitting the driving force distributed by the multi-disc clutch mechanism;

a rear wheel differential for inputting the driving force from the propeller shaft and outputting the driving force to left and right rear wheel drive shafts; and a disconnection/connection mechanism for disconnecting and connecting the rear wheel differential and one or both of the left and right rear wheel drive shafts, wherein the dragging torque of the multi-disc clutch mechanism is made smaller than the rotation resistance of a rear wheel driving force transmission section from the multi-disc clutch mechanism to the disconnection/connection mechanism in the two-wheel-drive mode, and the rear wheel differential and one or both of the left and right rear wheel drive shafts are disconnected by the disconnection/connection mechanism, thereby the rotation of the rear wheel driving force transmission section is stopped.

Herein, the multi-disc clutch mechanism includes a plurality of clutch discs that can be displaced in the axial direction of the multi-disc clutch mechanism, and a lubricating oil supply amount change mechanism to control the supply amount of lubricating oil to the clutch discs, and stops or limit the supply of the lubricating oil to the clutch discs to a specified amount by the lubricating oil supply amount change mechanism at the time when the multi-disc clutch mechanism is released, and makes the total of the intervals among the clutch discs above a specified value to make the dragging torque by the lubricating oil of the multi-disc clutch mechanism smaller than the rotation resistance of the rear wheel driving force transmission section.

Further, the multi-disc clutch mechanism includes spacers to urge in the direction to widen the intervals among the clutch discs, and the spacer is a plate spring member having a sandwiching unit to be inserted into a concave unit in the disc thickness direction provided in the circumferential part of the clutch disc, and an elastic piece that expands from the sandwiching unit to the radial direction of both the surfaces of the clutch disc and is deformable in the axial direction of the clutch disc, furthermore, the plate spring member is provided in the internal circumferential part of the clutch disc, and in the plate spring member, the elastic piece is opened in the external circumferential direction of the clutch disc.

The lubricating oil supply amount change mechanism includes an oil pump that is driven in conjunction with the output to the front wheels and supplies lubricating oil to the clutch discs, a press member that moves in the axial direction to fasten and release the clutch discs, and an oil hole opening/closing unit that opens and closes an oil hole to supply the lubricating oil to the clutch discs in conjunction with the press member and controls the flow amount of the lubricating oil, and the oil hole opening/closing unit closes the oil hole at the position where the clutch discs are released, and opens the oil hole at the position where the clutch discs are fastened.

The oil hole opening/closing unit includes an oil hole position adjustment member that changes the positions of the oil hole to supply the lubricating oil to the clutch discs in conjunction with the movement limit in the fastening direction of the above press member which changes depending on the abrasion of the clutch discs.

Further, the multi-disc clutch mechanism includes a press member that moves in the axial direction to fasten and release the clutch discs, a drive source that outputs a rotation power to move the press member, and a press mechanism that converts and amplifies the rotation power from the drive source to the fastening direction of the press member, and the conversion rate to the axial direction displacement of the press member to the rotation angle of the drive source is higher in a shift section where the press member moves from the standby position in the releasing direction to the fastening start position in the fastening direction than in a press section where the fastening power is changed continually from the fastening start position to the fastening end position in the fastening direction.

The press member includes a ball cam mechanism in which the ball cam grooves expanding in the circumferential direction on facing surfaces of a fixed cam plate and a rotation cam plate provided coaxially with the press mechanism are provided and balls are sandwiched between the ball cam grooves, and the ball cam grooves have a nonlinear area to move the press member in the shift section, and a linear area to move the press member in the press section, and the displacement in the axial direction to the rotation angle of the rotation cam plate is larger in the nonlinear area than in the linear area.

The ball cam mechanism includes a retainer to retain the relative positions of the respective balls provided in the circumferential direction, and the retainer includes a positioning unit to regulate the initial positions of the balls to the ball cam grooves.

Further, the press mechanism includes a rotation cam plate provided coaxially with the press member to convert a rotation displacement into an axial direction displacement, a fringe cam having a cam surface in the circumferential direction and driven to rotate by the drive source, and a cam follower to be engaged with the fringe cam at the end of an arm unit expanding from the rotation cam plate, and the cam surface includes a nonlinear area to move the press member in the shift section, and a linear area to move the press member in the press section, and the normal direction displacement of the cam follower to the rotation angle of the fringe cam is larger in the nonlinear area than in the linear area.

Alternatively, the multi-disc clutch mechanism includes a press member for moving in the axial direction to fasten and release the clutch discs, a primary clutch for transmitting the output to the front wheels to the press member, an actuator for moving in the axial direction to fasten and release the primary clutch, and a press mechanism that converts and amplifies the rotation power from the primary clutch to the fastening direction of the press member.

According to the present invention, in two-wheel-drive mode, the rear wheel differential and one or both of the left and right rear wheel drive shafts are disconnected by the disconnection/connection mechanism and the rotation of the ring gear of the rear wheel differential accompanying the rotation of the rear wheels is restrained, and the intervals among the clutch discs of the multi-disc clutch mechanism are ensured by the spacers, the supply of the oil to the clutch discs is limited, and the dragging torque of the multi-disc clutch mechanism is made smaller than the friction torque of the rear wheel driving force transmission section, thereby, it is possible to stop the rotation of the structural elements of the rear wheel driving force transmission section, decrease the oil viscosity resistance and the friction loss in this section, and prevent the mileage from decreasing.

Furthermore, even when the end play is made large to ensure the interval of the clutch discs, the press mechanism is provided to move the press member faster in the approach section where the press member contacts or comes close to the clutch disc than in the press section thereafter, thereby, it is possible to prevent the mileage from decreasing, while not sacrificing the change response from the two-wheel drive to the four-wheel drive. The above and other objects, features, and advantages of the present invention will become more apparent from the following detailed description with reference to the drawings.

BRIEF DESCRIPTION OF THE DRAWINGS

FIGS. 14A to 14C are explanatory diagrams showing the ball cam grooves and the retainer of the ball cam mechanism in FIG. 5;

DETAILED DESCRIPTION OF THE PREFERRED EMBODIMENTS

Figure 1:
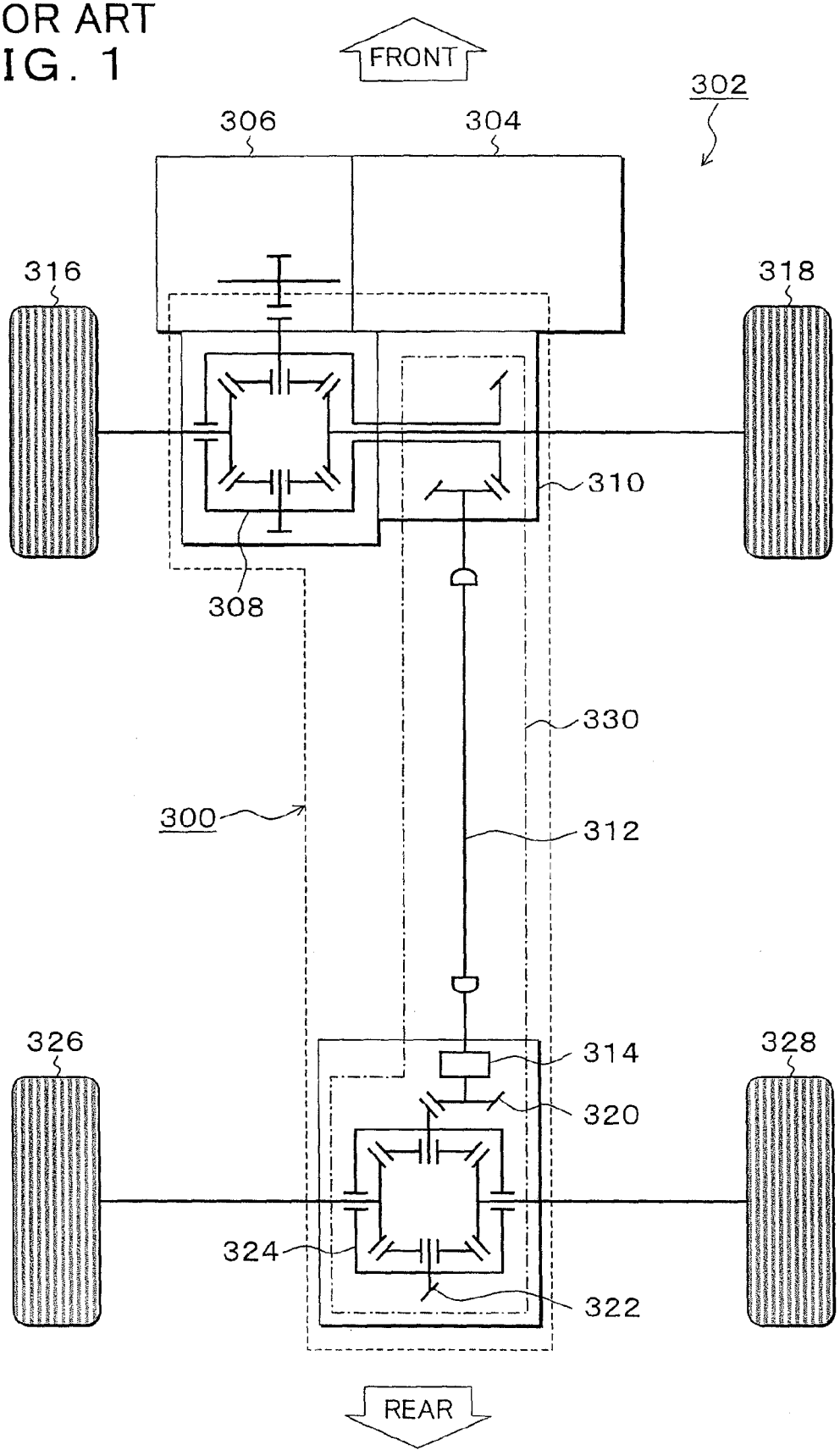
FIG. 1 is an explanatory diagram showing a conventional driving force transmission device for four-wheel-drive vehicle based on the two-wheel drive of front wheels.
Figure 2:
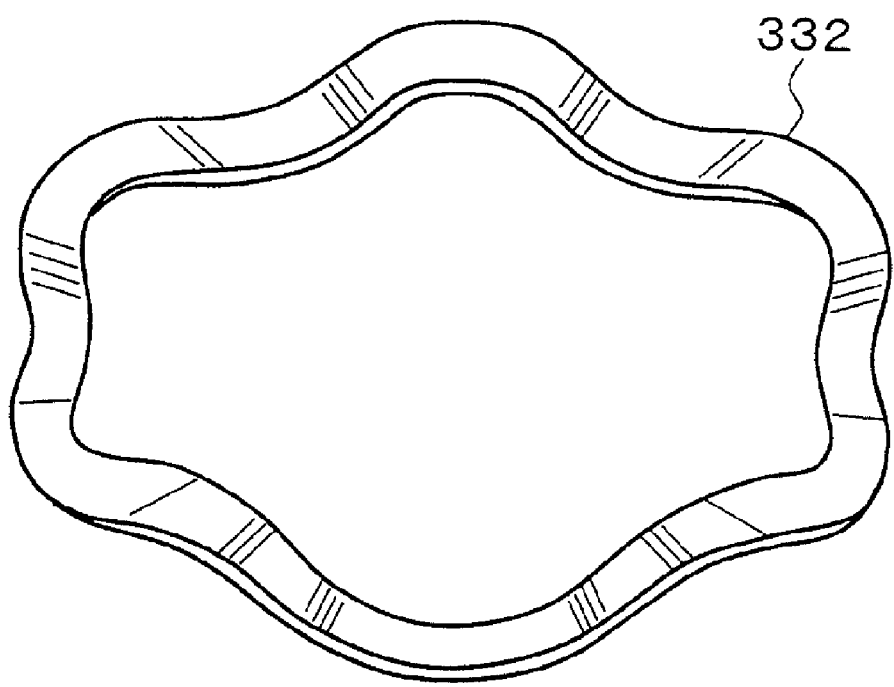
FIG. 2 is an explanatory diagram showing a dragging prevention ring spring of a conventional multi-disc clutch mechanism.
Figure 3:
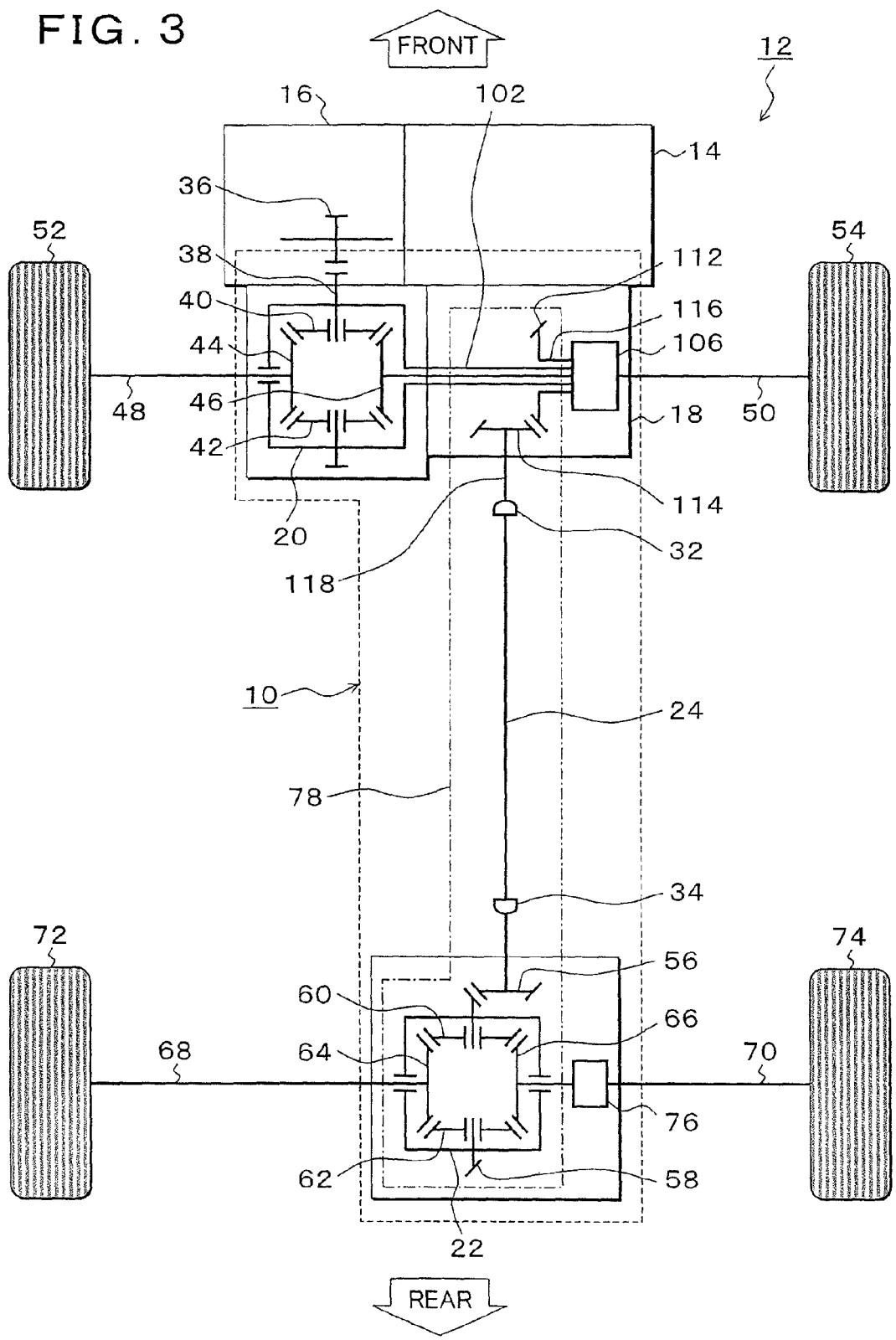
FIG. 3 is an explanatory diagram showing an embodiment of a driving force transmission device for four-wheel-drive vehicle based on the two-wheel drive of front wheels according to the present invention.

FIG. 3 is an explanatory diagram showing an embodiment of a driving force transmission device for a four-wheel-drive vehicle having front wheel drive in a two-wheel drive mode according to the present invention, and shows a case where the device is applied to a vehicle having front wheel drive in the two-wheel-drive mode. In FIG. 3, a driving force transmission device 10 according to the present embodiment is provided in a four-wheel drive vehicle 12, and includes a driving force distribution device 18, a front wheel differential 20 and a rear wheel differential 22. The rear wheel differential 22 is connected to the driving force distribution device 18 through a propeller shaft 24. The driving force from an engine 14 is changed by a gearbox 16, and input into an input shaft 102 of the driving force distribution device 18 through a drive gear 36 of a gearbox 16 and a ring gear 38 of the front wheel differential 20, and in the two-wheel-drive mode, when a multi-disc clutch mechanism 106 provided coaxially with the input shaft 102 is released, the driving force is not distributed to the rear wheels, but output to the front wheel differential 20 as it is. The ring gear 38 drives a left front wheel drive shaft 48 and a right front wheel drive shaft 50 through pinions 40 and 42, and side gears 44 and 46, and the left front wheel drive shaft 48 and the right front wheel drive shaft 50 rotate a left front wheel 52 and a right front wheel 54, respectively, and transmit the driving force to the road surface. Even if a rotation speed difference occurs between the left front wheel 52 and the right front wheel 54 owing to cornering or changes of the road surface states, the front wheel differential 20 absorbs the rotation speed difference, gives a same torque to the left front wheel 52 and the right front wheel 54, and makes the front wheels rotate. When the driver changes the mode from the two-wheel-drive mode to the four-wheel-drive auto mode, the ECU first fastens the multi-disc clutch mechanism 106, and then connects a disconnection/connection mechanism 76, thereby the driving force from the multi-disc clutch mechanism 106 is transmitted to a left rear wheel 072 and a right rear wheel 74. The driving force output from the rear wheel output shaft 118 is transmitted to a drive pinion 56 of the rear wheel differential 22 through a universal joint 32, the propeller shaft 24, and a universal joint 34, and the drive pinion 56 drives a left rear wheel drive shaft 68 and a right rear wheel drive shaft 70 through a ring gear 58, pinions 60 and 62, side gears 64 and 66, and the left rear wheel drive shaft 68, and the right rear wheel drive shaft 70 rotate the left rear wheel 72 and the right rear wheel 74, respectively, and transmit the driving force to the road surface. The disconnection/connection mechanism 76 connects the side gear 66 and the right rear wheel drive shaft 70 in the four-wheel drive, and the rotation of the side gear 66 is transmitted to the right rear wheel drive shaft 70 as it is. Even if a rotation speed difference occurs between the left rear wheel 72 and the right rear wheel 74 owing to cornering or changes of the road surface states, the rear wheel differential 22 absorbs the rotation speed difference, gives a same torque to the left rear wheel 72 and the right rear wheel 74, and makes the rear wheels rotate. The fastening power of the multi-disc clutch mechanism 106 is controlled continually by a servo motor, and the driving force to be transmitted to the rear wheel output shaft 118 is increased and decreased according to need, thereby the driving force distribution of the front and rear wheels is controlled. When the mode is changed from the four-wheel-drive auto mode to the two-wheel-drive mode, the ECU first releases the multi-disc clutch mechanism 106, and then disconnects the disconnection/connection mechanism 76. In this case, the ECU may first disconnect the disconnection/connection mechanism 76, and then release the multi-disc clutch mechanism 106. The disconnection/connection mechanism 76 disconnects the side gear 66 and the right rear wheel drive shaft 70, and prevents the rotation power that the left rear wheel 72 and the right rear wheel 74 receive from the road surface from rotating the ring gear 58. Thereby, it is possible to solve the problem that the rear wheel driving force transmission section 78 from the ring gear 58 to the bevel gear 112 rotates even in the two-wheel drive mode in which the rear wheels are not driven, which is a factor to cause a mileage decrease in the two-wheel drive mode. Further, even if the driver does not operate the changeover switch, by the judgment of the ECU to detect the vehicle state, the mode may be changed to the two-wheel-drive mode automatically when the four-wheel drive mode is unnecessary, and on the contrary, the mode may be changed to the four-wheel-drive mode when the four-wheel drive mode is necessary.

In FIG. 3, it is supposed that the side gear 66 and the right rear wheel drive shaft 70 are connected in the two-wheel-drive mode, for example, when the side gears 64 and 66 rotate in the same direction and at the same speed, the pinion 60 and the pinion 62 do not rotate (rotate on their axes), but the ring gear 58 rotates. Even if there is a rotation speed difference between the side gears 64 and 66, the rotation speed changes if they rotate in the same direction, but the ring gear 58 rotates, and consequently, the drive pinion 56, the universal joint 34, the propeller shaft 24, the universal joint 32, the rear wheel output shaft 118, the output pinion 114, and the bevel gear 112 connected thereto rotate. Although this rear wheel driving force transmission section 78 from the ring gear 58 to the bevel gear 112 is the portion not required to rotate in the two-wheel drive, the rotation of this portion causes viscosity resistance of the oil and friction loss of bearings. In other words, the driving force that is transmitted from the left front wheel 52 and the right front wheel 54 to the road surface rotates the left rear wheel 72 and the right rear wheel 74, and rotates the rear wheel driving force transmission section 78 not required to rotate in the two-wheel drive, which causes loss of the driving force and invites the mileage decrease. Therefore, in the present invention, the connection between the side gear 66 and the right rear wheel drive shaft 70 is disconnected by the disconnection/connection mechanism 76 in the two-wheel-drive mode, and the dragging torque of the multi-disc clutch mechanism 106 is made smaller than the friction torque of the rear wheel driving force transmission section 78, thereby the rear wheel driving force transmission section 78 is prevented from rotating. When the connection between the side gear 066 and the right rear wheel drive shaft 70 is disconnected, the rotation of the right rear wheel 74 is not transmitted to the side gear 66, and therefore, the rotation of the side gear 64 by the left rear wheel 72 can rotate the side gear 66 through the pinion 60 and the pinion 62 in the opposite direction, and since the rotation resistance from the drive pinion 56 connected to the ring gear 58 to the bevel gear 112 is larger than the rotation resistance of the pinion 60, the pinion 62, and the side gear 66, the ring gear 58 does not rotate. The fact that the ring gear 58 does not rotate means that the rear wheel driving force transmission section 78 does not rotate, and the loss of the driving force in this case is limited In the parts where the pinion 60, the pinion 62, and the side gear 66 rotate, and accordingly it is possible to improve the mileage more than in the case where there is not the disconnection/connection mechanism 76 and the front wheel driving force transmission section 78 rotates. Further, in the present embodiment, the disconnection/connection mechanism 76 is provided between the side gear 66 in the rear wheel differential 22 and the right rear wheel drive shaft 70, but the disconnection/connection mechanism may be provided in either the inside or the outside of the rear wheel differential 22 as long as it is provided in the position to disconnect/connect the side gear 66 and the left rear wheel drive shaft 70, or the position to disconnect/connect the side gear 64 and the left rear wheel drive shaft 68, or in both of the positions. Furthermore, the mechanism may be other mechanism such as a method in which the unit to be constituted by the pinions 60 and 62, the side gears 64 and 66 are separated from the ring gear 58, and the connection thereof is disconnected and connected.

Figure 4A:
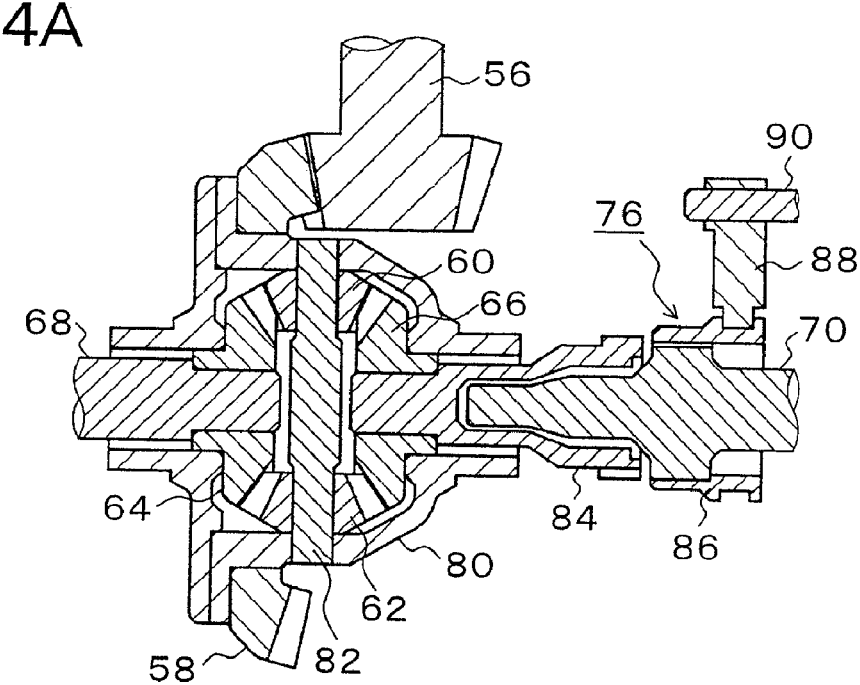
FIGS. 4A and 4B are cross sectional views showing an embodiment of the front wheel differential in FIG. 3.
Figure 4B:
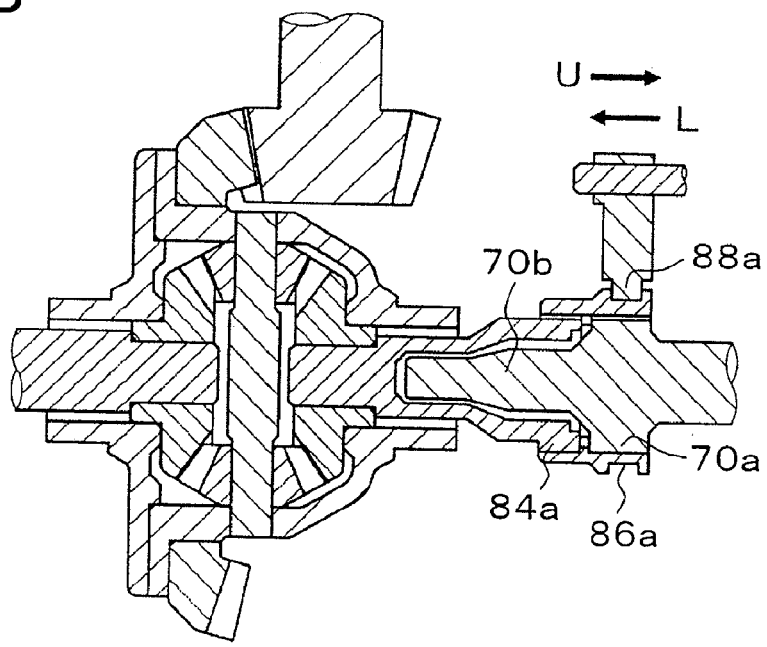

FIGS. 4A and 4B are cross sectional views showing an embodiment of the rear wheel differential 22 in FIG. 3, where the disconnection/connection mechanism 76 is provided. In FIG. 4A and 4B, the rear wheel differential 22 includes the ring gear 58 fixed to the external circumferential part of a differential gear case 80, a pinion 60 and a pinion 62 supported rotatably by a pinion shaft 82 fixed to the differential gear case 80, a side gear 64 supported unrotatably by the left rear wheel drive shaft 68 and engaged with the pinion 60 and the pinion 62 in the differential gear case 80, and a side gear 66 supported unrotatably by the side gear shaft 84 and engaged with the pinion 60 and the pinion 62 in the differential gear case 80. Furthermore, the rear wheel differential 22 includes a right rear wheel drive shaft 70 whose end 70b engaged with the side gear shaft 84 while not restricted by rotation directions, a sleeve 86 splined to a tooth unit 70a of the right rear wheel drive shaft 70 and a tooth unit 84a of side gear shaft 84 and slidable between the position to connect the right rear wheel drive shaft 70 and the side gear shaft 84 and the position to disconnect them, a fork 88 for sliding the sleeve 86 by an end 88a that is engaged slidably with a groove unit 86a of the sleeve 86, and a shift shaft 90 fixed to the fork 88 and driven in the axial direction by an actuator not shown, and transmits the driving force from the drive pinion 56 engaged with the ring gear 58 in the four-wheel drive to the left rear wheel 72 and the right rear wheel 74.

In FIG. 4A, the disconnection/connection mechanism 76 in the two-wheel drive is in non-connection state, and the sleeve 86 is not engaged with tooth unit 84a of the side gear shaft 84. The rotation of the right rear wheel drive shaft 68 is transmitted to the side gear 66 through the side gear 64, the pinion 60 and the pinion 62, and because the ring gear 58 does not rotate, the side gear shaft 84 is rotated in the direction opposite to the rotation direction of the left rear wheel drive shaft 68.

In FIG. 4B, in the state where the fork 88 moves to the L direction in the four-wheel drive, and the disconnection/connection mechanism 76 is connected thereto, the sleeve 86 is engaged with the tooth unit 84a of the side gear shaft 84. The ring gear 58 rotates by the drive pinion 56, and rotates the left rear wheel drive shaft 68 and the right rear wheel drive shaft 70 in the same direction. When the mode is changed back to the two-wheel drive, the fork 88 moves in the U direction, and the disconnection/connection mechanism 76 is changed back to the non-connection state. As another factor to cause the mileage decrease in the two-wheel-drive mode, there is the problem that the rear wheel driving force transmission section 78 rotates because the so-called dragging torque that occurs by the viscosity resistance of the oil arising from the rotation speed difference between the driving side (rear-wheel side) and the driven side (front-wheel side) of the clutch discs provided to the multi-disc clutch mechanism 106 and the friction loss by the contact between the clutch discs is larger than the friction torque of the rear wheel driving force transmission section 78.

Figure 5:
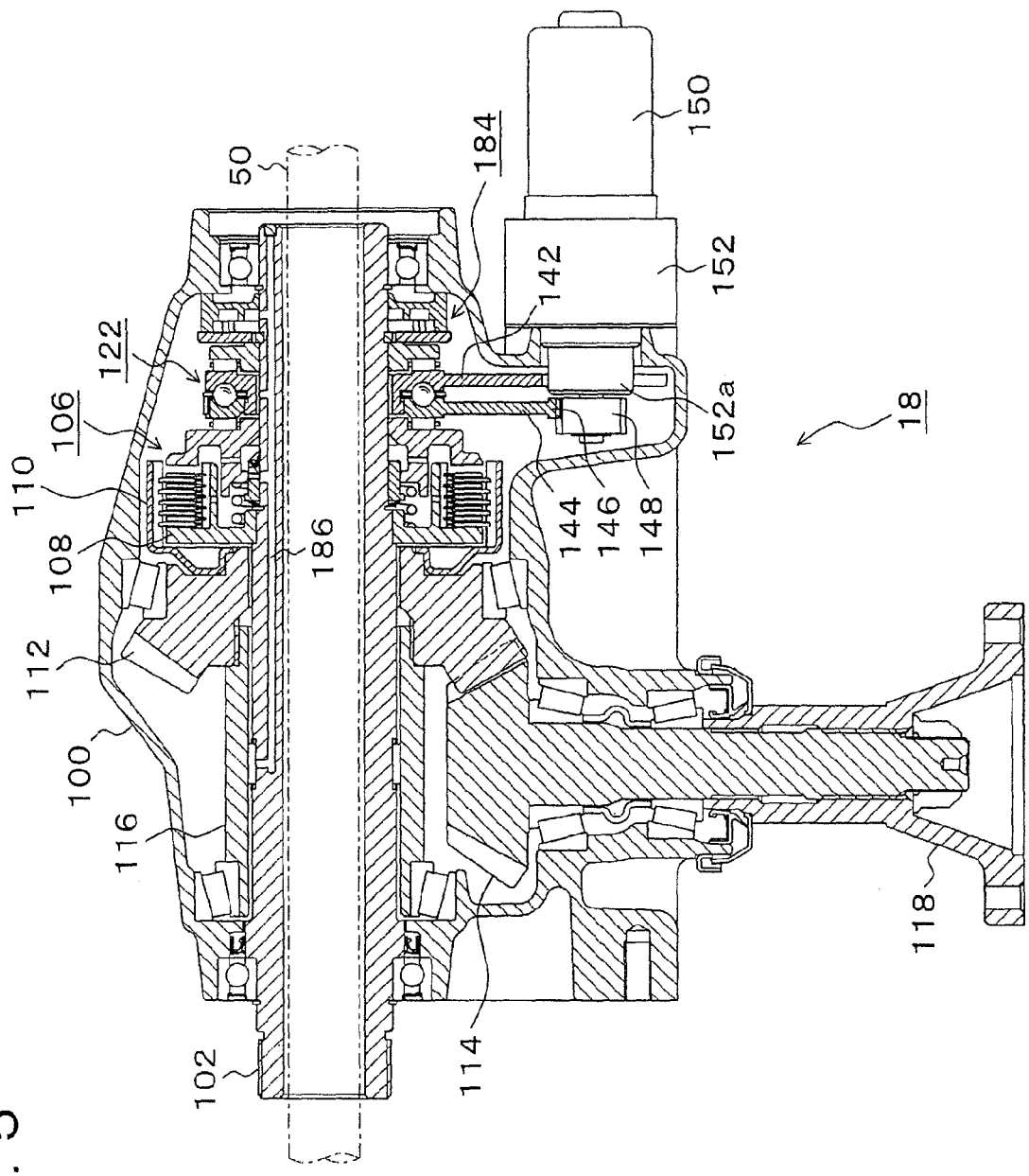
FIG. 5 is a cross sectional view showing an embodiment of the driving force distribution device in FIG. 3.

FIG. 5 is a cross sectional view showing an embodiment of the driving force distribution device 18 in FIG. 3. In FIG. 5, the driving force distribution device 18 includes a case 10, and an input shaft 102 that inputs the driving force from the engine 14 into the left side of the case 10 through the gearbox 16, and the ring gear 38 of the front wheel differential 20 is provided, and to the input shaft 102, a right front wheel drive shaft 50 is penetrated rotatably. A multi-disc clutch mechanism 106 and a ball cam mechanism 122 are provided coaxially with the input shaft 102, and the multi-disc clutch mechanism 106 fixes a clutch hub 108 to the input shaft 102 and connects a clutch drum 110 to a bevel gear 112 provided rotatably with the bevel gear shaft 116 to the input shaft 102. Perpendicular to the input shaft 102, a rear wheel output shaft 118 for outputting the driving force to the rear wheel side is provided in the left bottom of the case 10, and an output pinion 114 is connected to the rear wheel output shaft 118 and engaged with a bevel gear 112. An oil pump 184 is provided at the opposite side of the multi-disc clutch mechanism 106 of the ball cam mechanism 122, and gets power from the input shaft 102 and supplies oil to an oil path 186 provided in the input shaft 102. In such a driving force distribution device 18, the clutch hub 108 and the clutch drum 110 of the multi-disc clutch mechanism 106 are released in the two-wheel drive, and the driving force of the input shaft 102 is not transmitted to the rear wheel output shaft 118. In the four-wheel drive, the multi-disc clutch mechanism 106 is fastened, and the driving force from the input shaft 102 is transmitted also to the rear wheel output shaft 118 through the multi-disc clutch mechanism 106, the bevel gear 112, and the output pinion 114.

Figure 6:
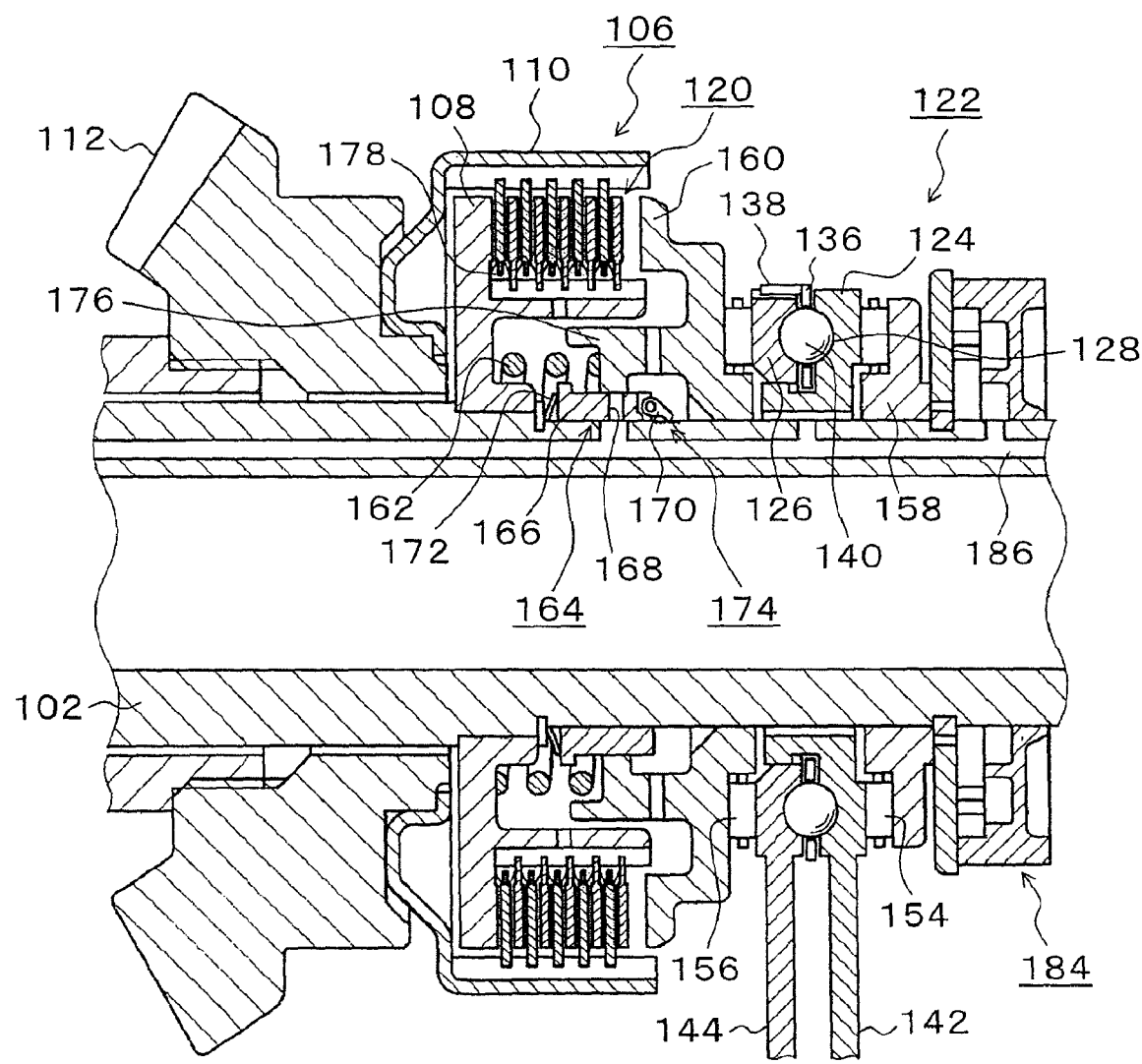
FIG. 6 is a cross sectional view showing the multi-disc clutch mechanism and the ball cam mechanism in FIG. 5.

FIG. 6 is a cross sectional view showing the multi-disc clutch mechanism 106 and the ball cam mechanism 122 in FIG. 5. In FIG. 6, to the multi-disc clutch mechanism 106, a ball cam mechanism 122 to control the fastening power of clutch discs 120 provided between the clutch hub 108 and the clutch drum 110 is provided. The clutch disc 120 includes spacers 178 for retaining intervals among the clutch discs. In the ball cam mechanism 122, a ball 140 is sandwiched in ball cam grooves 128 of the cam surfaces of a pair of a fixed cam plate 124 and a rotation cam plate 126 provided relatively rotatably and coaxially with the input shaft 102. Furthermore, a retainer 136 having a projection 138 for positioning is provided between the fixed cam plate 124 and the rotation cam plate 126.

Figure 7:
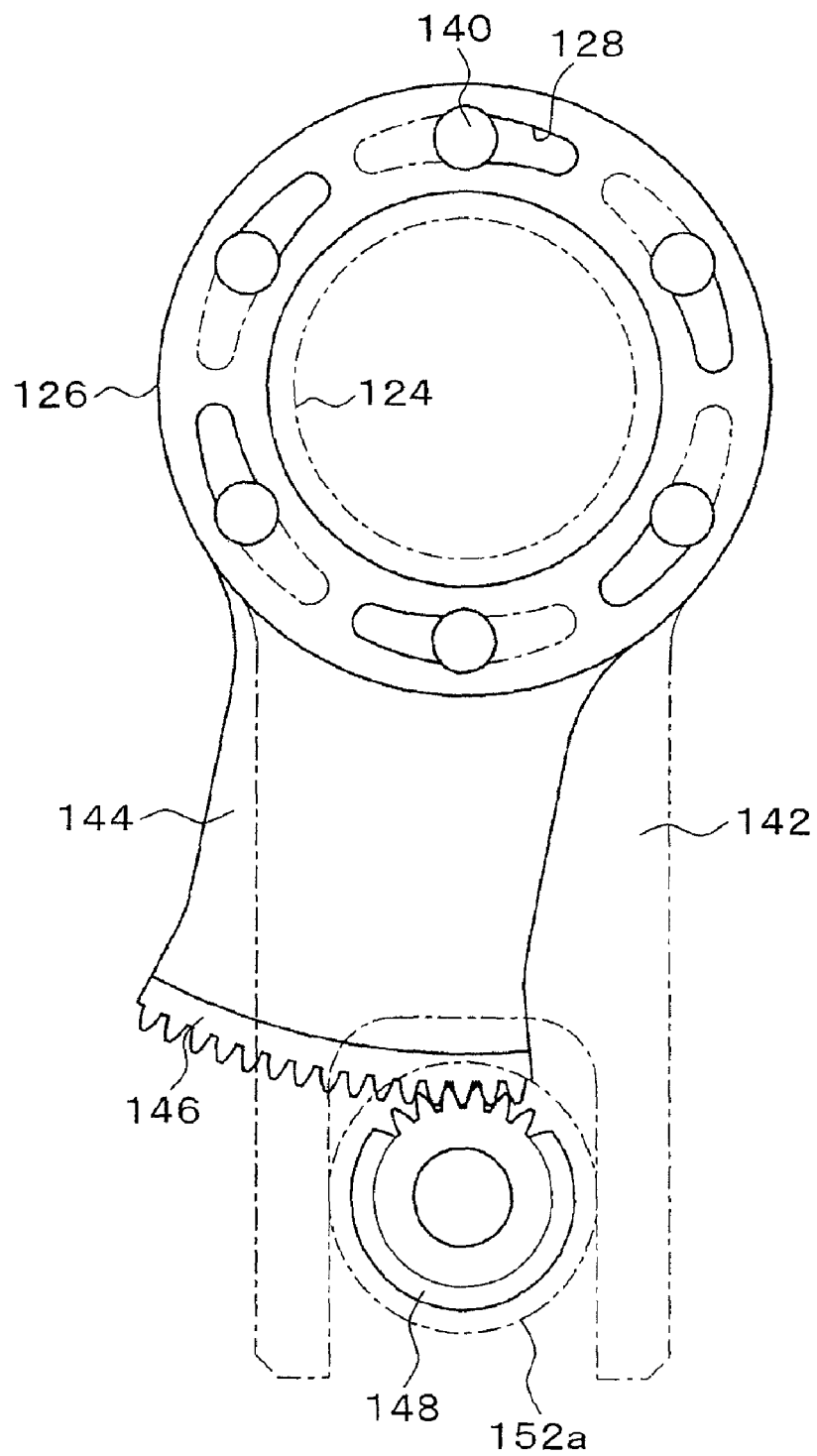
FIG. 7 is an explanatory diagram showing the ball cam mechanism in FIG. 5 viewed from the axial direction.

FIG. 7 is an explanatory diagram showing the ball cam mechanism 122 in FIG. 5 viewed from the direction of the oil pump 184. In FIG. 7, in the fixed cam plate 124, a U-shaped end of its expanded arm unit 142 is engaged with the outside of a retaining unit 152a, thereby the rotation is stopped. The rotation cam plate 126 includes a plurality of ball cam grooves 128 in its circumferential direction, and a fan type gear 146 formed on the end of its arm unit 144 is engaged with a drive gear 148. With reference to FIGS. 5 and 6 again, the servo motor 150 rotates the drive gear 148 through a reduction gear 152. A fixed plate 158 is provided in the right side of fixed cam plate 124 through a thrust bearing 154, and a press member 160 is provided in the left side of the rotation cam plate 126 through a thrust bearing 156. The press member 160 is urged to the releasing direction of the multi-disc clutch mechanism 106 by a return spring 162 provided between the clutch hub 108 and the press member. When the rotation cam plate 126 is driven to rotate in the specified direction by the drive gear 148, the ball cam mechanism 122 receives the press by the ball 140 sandwiched between the ball cam grooves 128 which are the inclined grooves of the facing surfaces and presses the press member 160 and a return spring 162 in the axial direction, and the press member 160 presses the clutch discs 120 of the multi-disc clutch mechanism 106, and thereby the ball cam mechanism increases the transmission torque depending on the rotation amount of the drive gear 148, and becomes its direct connection state at the maximum press position. In the part surrounded by the input shaft 102, the clutch hub 108, and the press member 160, an oil hole opening/closing unit 164 for controlling the supply of the oil to the clutch discs 120 of the multi-disc clutch mechanism 106 from an oil path 186 is provided. The oil hole opening/closing unit 164 includes an oil hole 168, an oil hole position adjustment member 166 having a ratchet claw 170, a disc spring 172, a rack 174 provided in the input shaft 102, and a valve 176 provided in the press member 160 to open and close the oil hole 168.

Figure 8A:
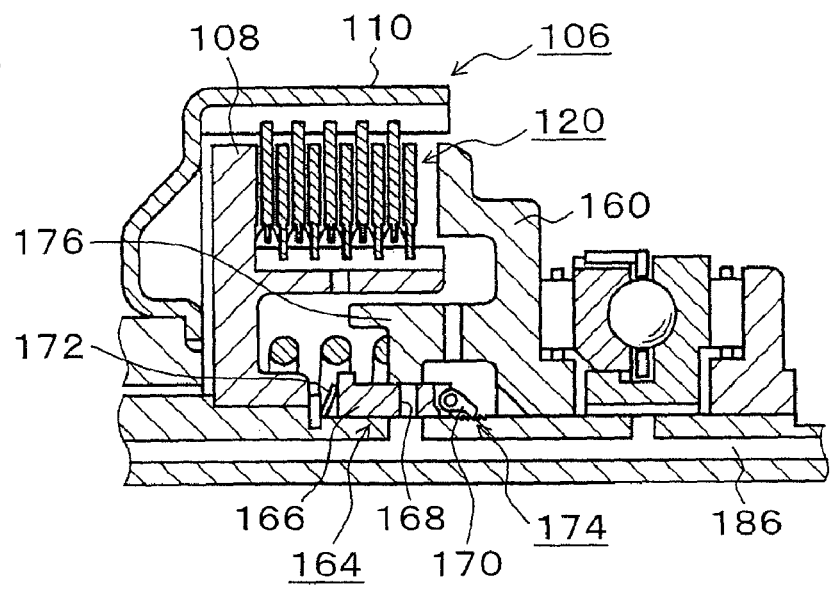
FIGS. 8A to 8C are explanatory diagrams showing the movement of the oil hole opening/closing unit of the multi-disc clutch mechanism in FIG. 5.
Figure 8B:
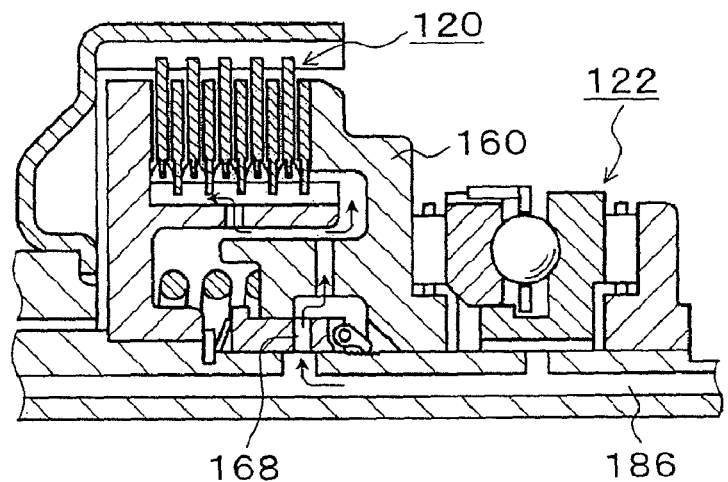
Figure 8C:
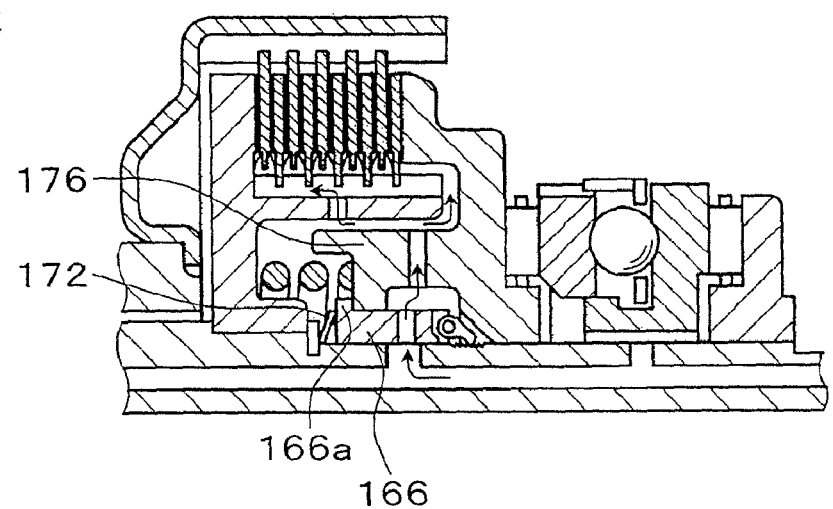

FIGS. 8A to 8C are explanatory diagrams showing the movement of an oil hole opening/closing unit 164 of the multi-disc clutch mechanism 106 in FIG. 5. FIG. 8A shows a state where the multi-disc clutch mechanism 106 is released in the two-wheel drive, and the press member 160 is at standby position most away from the clutch discs 120. The oil hole position adjustment member 166 is urged to the right side by the disc spring 172 and regulated by the ratchet claw 170 and the rack 174. In this state, the clutch discs engaged with the clutch drum 110 among the clutch discs 120 do not rotate, but the clutch discs engaged with the clutch hub 108 rotate in conjunction with the rotation of the input shaft 102. However, when the press member 160 is at this position, the valve 176 closes the oil hole 168, and accordingly, the oil from the oil path 186 is not supplied to the clutch discs 120, and the viscosity resistance by the oil is reduced, and thereby, it is possible to prevent the dragging at the side of the clutch drum 110. Further, in the present embodiment, the valve 176 closes the oil hole 168 completely in the state where the multi-disc clutch mechanism 106 in FIG. 8A is released, but at this moment, the valve 176 may not close the oil hole 168 completely, and some amount of oil may be supplied to the clutch discs 120, and the amount may be optionally set in consideration of the lubrication and the cooling of the clutch discs 120.

FIG. 8B shows the fastening initial state of the multi-disc clutch mechanism 106 on the way of the change from the two-wheel drive to the four-wheel drive, and the press member 160 which is pressed by the ball cam mechanism 122 and moved to the left side is at the position to start the contact to the clutch discs 120. From this point in time, the clutch discs 120 start contacting one another gradually, and by the friction torque thereof, the multi-disc clutch mechanism 106 starts transmitting the driving force to the front wheel side. Because the valve 176 opens the oil hole 68 at this position, the oil is supplied from the oil path 186 to the clutch discs 120 as shown by arrows, and thereby the clutch discs are prevented from being seized.

FIG. 8C shows the state where the mode is changed into the four-wheel drive, and the multi-disc clutch mechanism 106 is completely fastened, and the press member 160 is at maximum press position where there is not any interval between the clutch discs 120 at all. In the oil hole position adjustment member 166, a projection 166a is pressed to the valve 176, and the ratchet claw 170 is engaged with and retained by the rack 174 at the maximum press position of the press member 160.

Figure 9A:
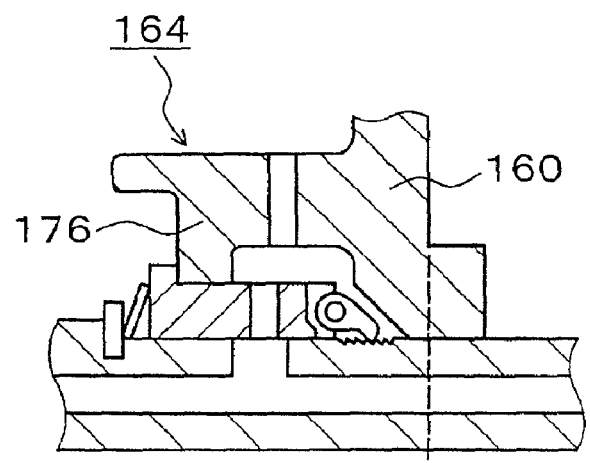
FIGS. 9A and 9B are explanatory diagrams showing the movement of the oil hole position adjustment member of the oil hole opening/closing unit in FIG. 8.
Figure 9B:
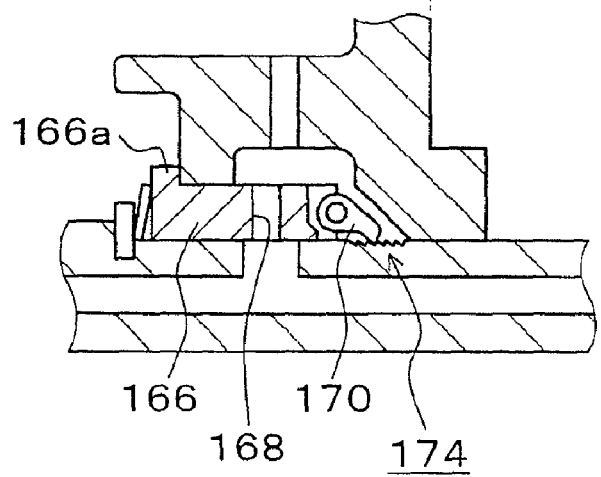

FIGS. 9A and 9B are explanatory diagrams showing the movement of the oil hole position adjustment member 166 of the oil hole opening/closing unit 164 in FIGS. 8A to 8C. FIG. 9A show the oil hole opening/closing unit 164 in the state where the clutch discs 120 are not abraded or in the initial state of the abrasion, and FIG. 9B shows the oil hole opening/closing unit 164 in the state where the abrasion of the clutch discs 120 progresses. When the abrasion of the clutch discs 120 progress from FIG. 9A to FIG. 9B, the maximum press position of the press member 160 moves to the direction where the clutch stroke becomes deep by the distance roughly same as the total of the decreased disc thickness of all the clutch discs 120, that is, to the left side by a distance W. In conjunction with the movement of the maximum press position of the press member 160, the position where the projection 166a of the oil hole position adjustment member 166 is pressed to the valve 176 changes to the left side, and at the position, the ratchet claw 170 is engaged with the rack 174, and the oil hole position adjustment member 166 is retained. Since the oil hole position adjustment member 166 follows the abrasion of the clutch disc 120, the timing of the opening start of the oil hole 168 is not influenced by the abrasion degree of the clutch disc 120, and becomes roughly constant to the intervals among the clutch disc 120, and accordingly it is possible to stabilize the oil supply amount that gives influences to the lubrication, cooling, dragging and the like of the clutch disc 120.

Figure 10:
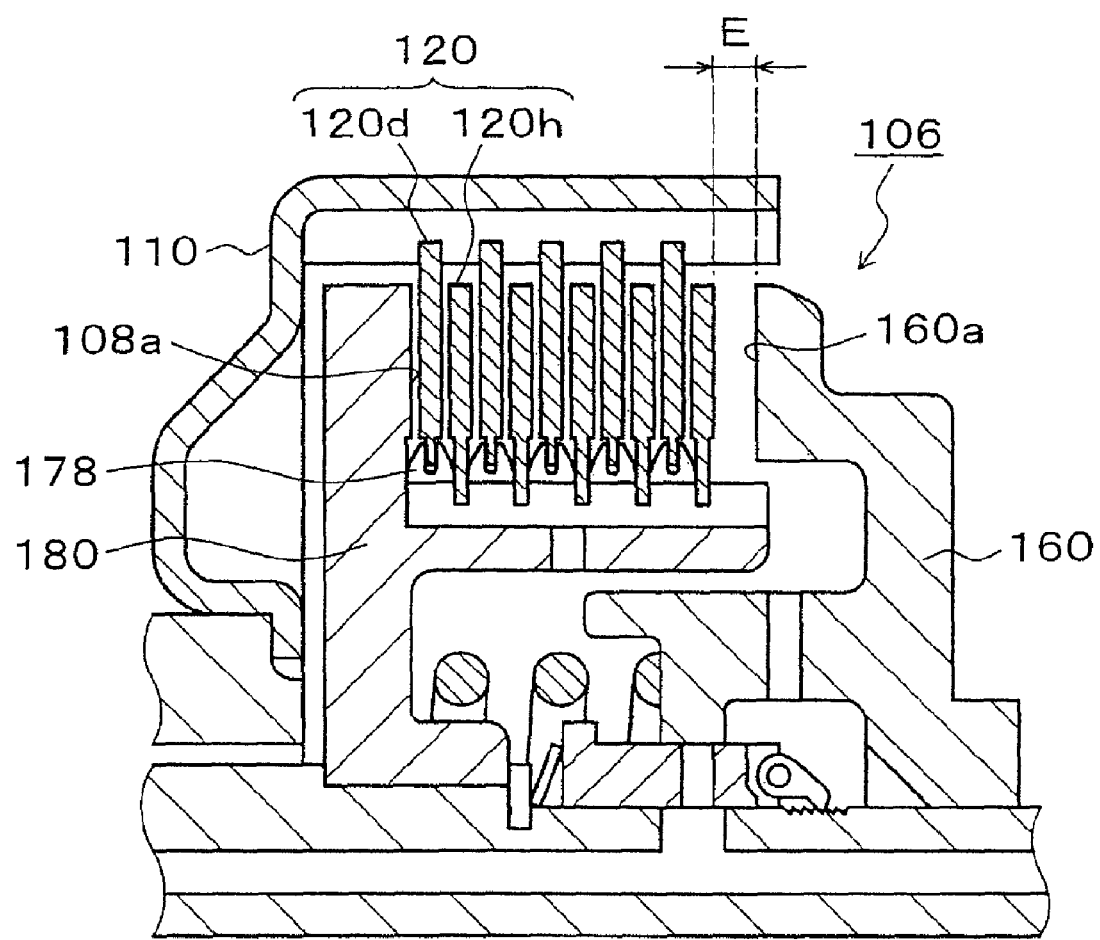
FIG. 10 is an explanatory diagram showing the spacer setting state of the multi-disc clutch mechanism in FIG. 5.

FIG. 10 is an explanatory diagram showing the setting state of the spacer 178 of the multi-disc clutch mechanism 106 in FIG. 5. FIG. 10 shows the state where the multi-disc clutch mechanism 106 is released in the two-wheel drive, and the press member 160 is at the standby position most away from the clutch disc 120. The multi-disc clutch mechanism 106 includes a plurality of clutch discs 120 which can move in the axial direction, and in the clutch discs 120, inside clutch discs 120h are splined to the external circumference of the clutch hub 108, and outside clutch discs 120d are splined to the internal circumference of the clutch drum 110, and, the inside clutch discs 120h and the outside clutch discs 120d are provided alternately. Spacers 178 which are plate spring molded of a plate material are provided in the internal circumferential parts of the outside clutch discs 120d, and ensure the intervals among the frictional surfaces not to cause the dragging with the clutch discs 120h at both the adjacent sides. The clutch discs 120 can move in the axial direction between a pressed surface 108a of the clutch hub 108 and the pressing surface 160a of the press member 160, and there is an interval E to the press side 160a, meanwhile without the spacers 178, the clutch discs 120 adhere one another by the oil and do not separate, and cause the dragging. Since the spacers 178 ensure the intervals among the frictional surfaces, it is possible to prevent the loss of the driving force owing to the dragging and improve the mileage. Further, the value of the interval E at the moment when the press member 160 is at the standby position most away from the clutch discs 120 may not necessarily constant by the states of the intervals among the clutch discs 120. The spacers 178 may be provided in the external circumferential parts of the inside clutch discs 120h, but it is preferable to provide the same in the inside with a small torque loss. In other words, with a same frictional resistance by sliding between the clutch discs 120 adjacent to the clutch discs 120 in which the spacers 178 is provided and the spacers 178, the friction torque is smaller when the spacers are provided in the inside, and the friction torque becomes the loss of the driving force. Further, it is preferable that the spring load of the spacers 178 is as small as in the range that the intervals to the adjacent clutch discs 120h can be retained.

Figure 11:
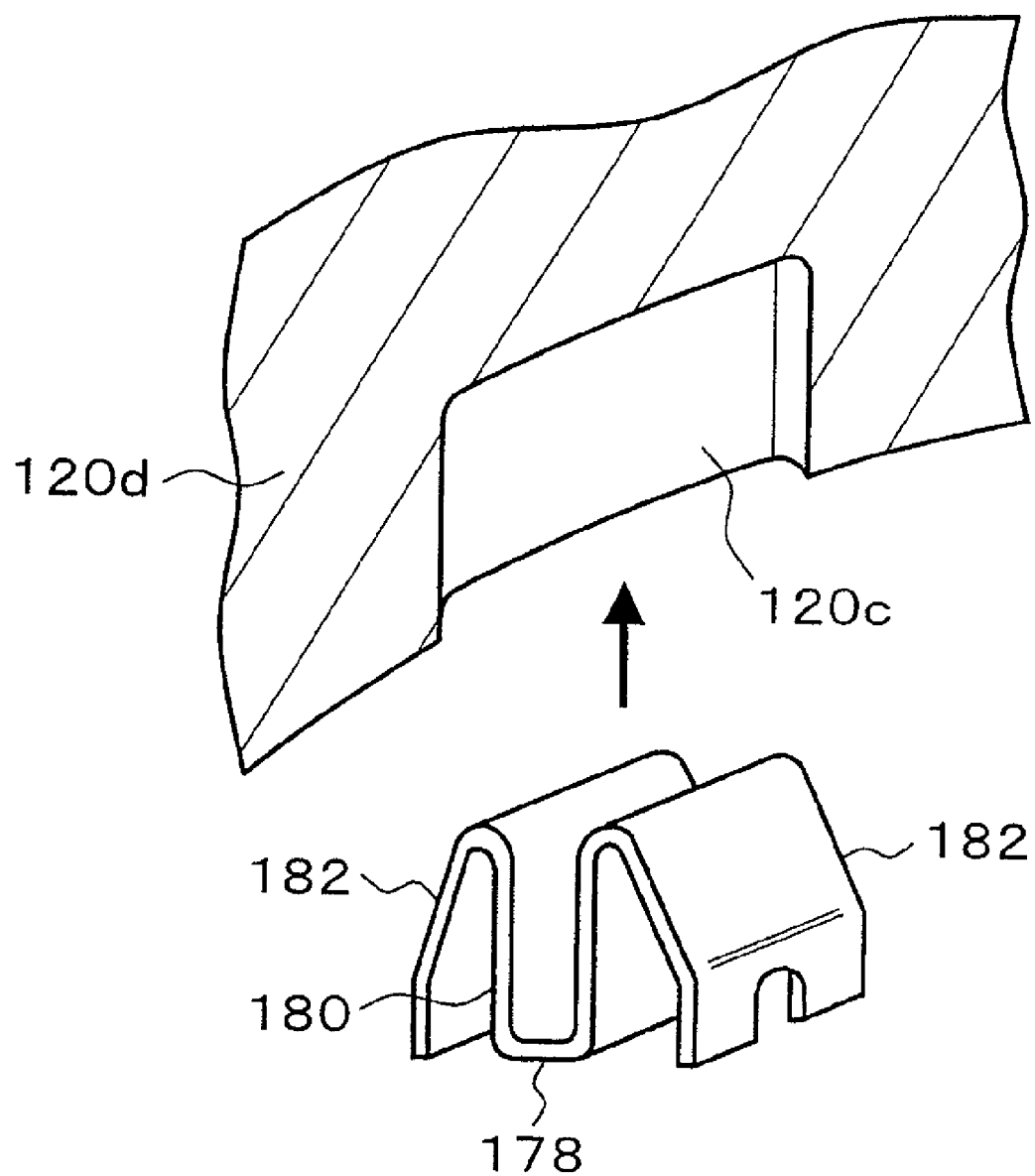
FIG. 11 is a perspective view showing the spacer in FIG. 10.

FIG. 11 is a perspective view showing the spacer in FIG. 10. In FIG. 11, the spacer 178 is a plate spring molded of a plate material, and includes a sandwiching unit 180 to be inserted into a concave unit 120c provided in the plate thickness direction in the internal circumferential part of the outside clutch disc 120d, and an elastic piece 182 that expands from the sandwiching unit 180 in the outer diameter direction of both the surfaces of the adjacent clutch discs 120 and can be transformed in the axial direction of the clutch discs 120. The interval of the sandwiching unit 180 is set narrower than the thickness of concave unit 120c in order to insert and fix the spacer 178 into the concave unit 120c in the direction showed by an arrow.

Figure 12A:
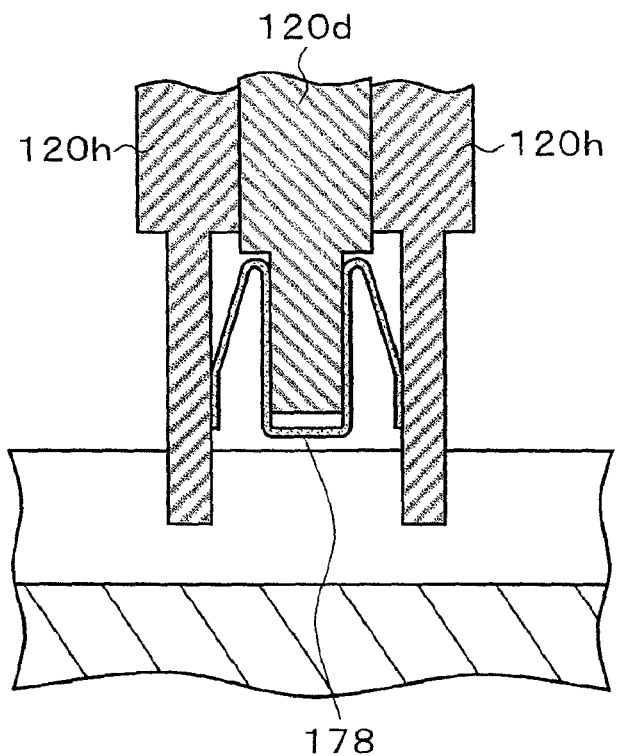
FIGS. 12A and 12B are cross sectional views showing the spacer in FIG. 10.
Figure 12B:
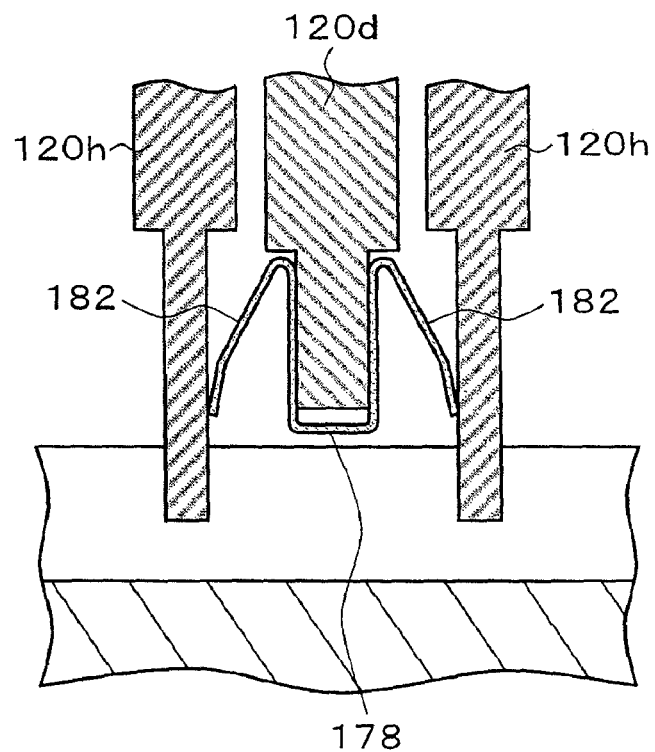

FIGS. 12A and 12B are cross sectional views showing the spacer 178 of FIG. 10. FIG. 12A shows the state where the multi-disc clutch mechanism 106 is fastened in the four-wheel drive, and the respective frictional surfaces of the outside clutch disc 120d in which the spacer 178 is provided and the inside clutch discs 120h adjacent thereto are closely attached for the rotation. FIG. 12B shows the state where the multi-disc clutch mechanism 106 is released in the two-wheel drive, and the respective frictional surfaces of the outside clutch disc 120d in which the spacer 178 is provided and the inside clutch discs 120h adjacent thereto are separated apart to the intervals not to cause the dragging by the spacer 178.

In FIG. 12B, since the inside clutch discs 2120h rotate, and the outside clutch disc 120d does not rotate, the ends of the elastic piece 182s of the spacer 178 slide with the inside clutch discs 120h. Therefore, it is preferable for the ends of the elastic piece 182 to come in contact with the portion that is not a frictional surface.

Figure 13A:
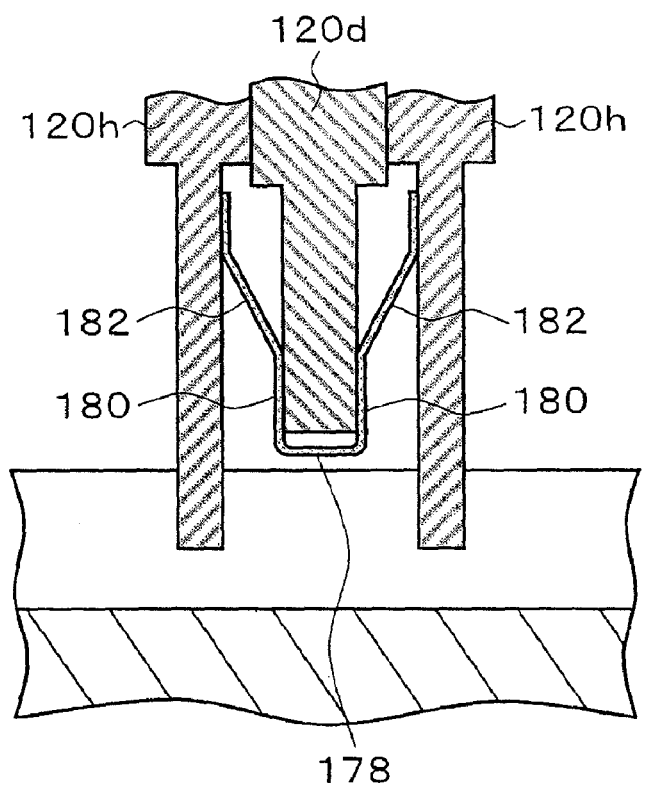
FIGS. 13A and 13B are cross sectional views showing another embodiment of the spacer of the multi-disc clutch mechanism in FIG. 5.
Figure 13B:
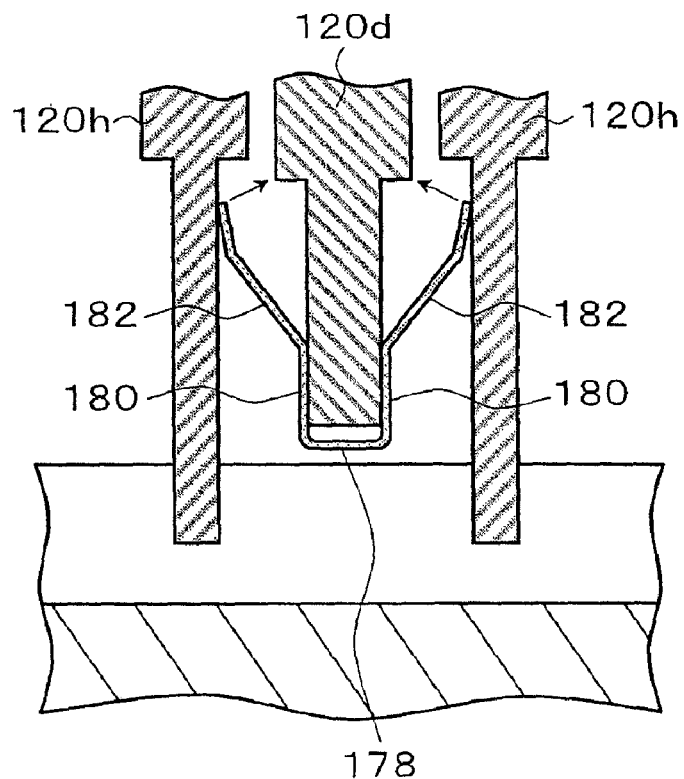

FIGS. 13A and 13B are cross sectional views showing another embodiment of the spacer 178 of the multi-disc clutch mechanism 106 in FIG. 5. In FIGS. 13A and 13B, the spacer 178 is a plate spring molded of a plate material, and includes a sandwiching unit 180 to be inserted into a concave unit 120c provided in the plate thickness direction in the internal circumferential part of the outside clutch disc 120d, and an elastic piece 182 that expands from the sandwiching unit 1180 in the inner diameter direction of both the surfaces of the adjacent inside clutch discs 120h and can be transformed in the axial direction of the inside clutch discs 120h.

FIG. 13A shows the state where the multi-disc clutch mechanism 106 is fastened, and the respective frictional surfaces of the outside clutch disc 120d in which the spacer 178 is provided and the inside clutch discs 120h adjacent thereto is closely attached. FIG. 13B shows the state where the multi-disc clutch mechanism 106 is released, and the respective frictional surfaces of the outside clutch disc 120d in which the spacer 178 is provided and the inside clutch discs 120h adjacent thereto are separated apart with the intervals not to cause the dragging by the spacer 178. In the middle position between FIG. 13A and FIG. 13B, the inside clutch discs 120h and the outside clutch disc 120d rotate together, but since there is a rotation speed difference, the ends of the elastic piece 182 slide with the adjacent inside clutch discs 120h. However, the ends of the elastic piece 182 receives a force in the direction to close as shown by arrows, by a centrifugal force by the rotation of the outside clutch disc 120d, and thereby it is possible to reduce the frictional resistance.

FIGS. 14A to 14C are explanatory diagrams the showing ball cam grooves 128 and a retainer 136 of the ball cam mechanism 122 in FIG. 5. In FIGS. 14A to 14C, a ball 140 is sandwiched and retained in ball cam grooves 128 in facing cam surfaces of a pair of a fixed cam plate 124 and a rotation cam plate 126. The ball cam groove 128 includes an initial area 130 and an inclined area 132 whose cam shapes are different with a runover unit 134 as the border. Further, a retainer 136 for retaining the relative position of the ball 140 is provided between the fixed cam plate 124 and the rotation cam plate 126, and the retainer 136 includes a projection 138 for positioning to regulate the initial position of the ball 140 to the ball cam groove 128. The projection 138 is engaged with a guide unit 127 formed on the external circumferential part of the rotation cam plate 126.

FIG. 14A shows the state where the multi-disc clutch mechanism 106 is released in the two-wheel drive, and the press member 160 is at the standby position, and the ball 140 is positioned in the initial area 130 of both the ball cam grooves 128 of the fixed cam plate 124 and the rotation cam plate 126.

FIG. 14B shows the state where the press member 160 starts contacting the clutch disc 120 in the fastening initial state when the mode shifts from the two-wheel drive to the four-wheel drive, and the ball 140 is at the position shifted from the runover unit 134 to the inclined part 132 of the ball cam grooves 128.

FIG. 14C shows the state where the mode is changed to the four-wheel drive, the multi-disc clutch mechanism 106 is fastened, and the press member 160 is at the position to press the clutch discs 120, and the ball 140 is positioned at the inclined parts 132 of the ball cam grooves 128. When a plurality of balls 140 are provided on the circumference in order to disperse the load, there may be a relative displacement among the balls owing to the slide of the ball cam grooves 128 and the balls 140 at the moment of the action of the ball cam mechanism 122, and in that case, it is not possible to press the ball cam grooves 128 equally, and a biased load occurs in the multi-disc clutch mechanism 106 and the surface durability of the ball cam grooves 128 is conspicuously deteriorated. By providing the retainer 136, the relative position of the respective balls 140 is retained, and at every moment the balls return from FIG. 14C to the initial position of FIG. 34A, the initial position of the respective balls 140 to the ball cam grooves 128 are corrected by the projection 138 for the positioning.

Figure 15:
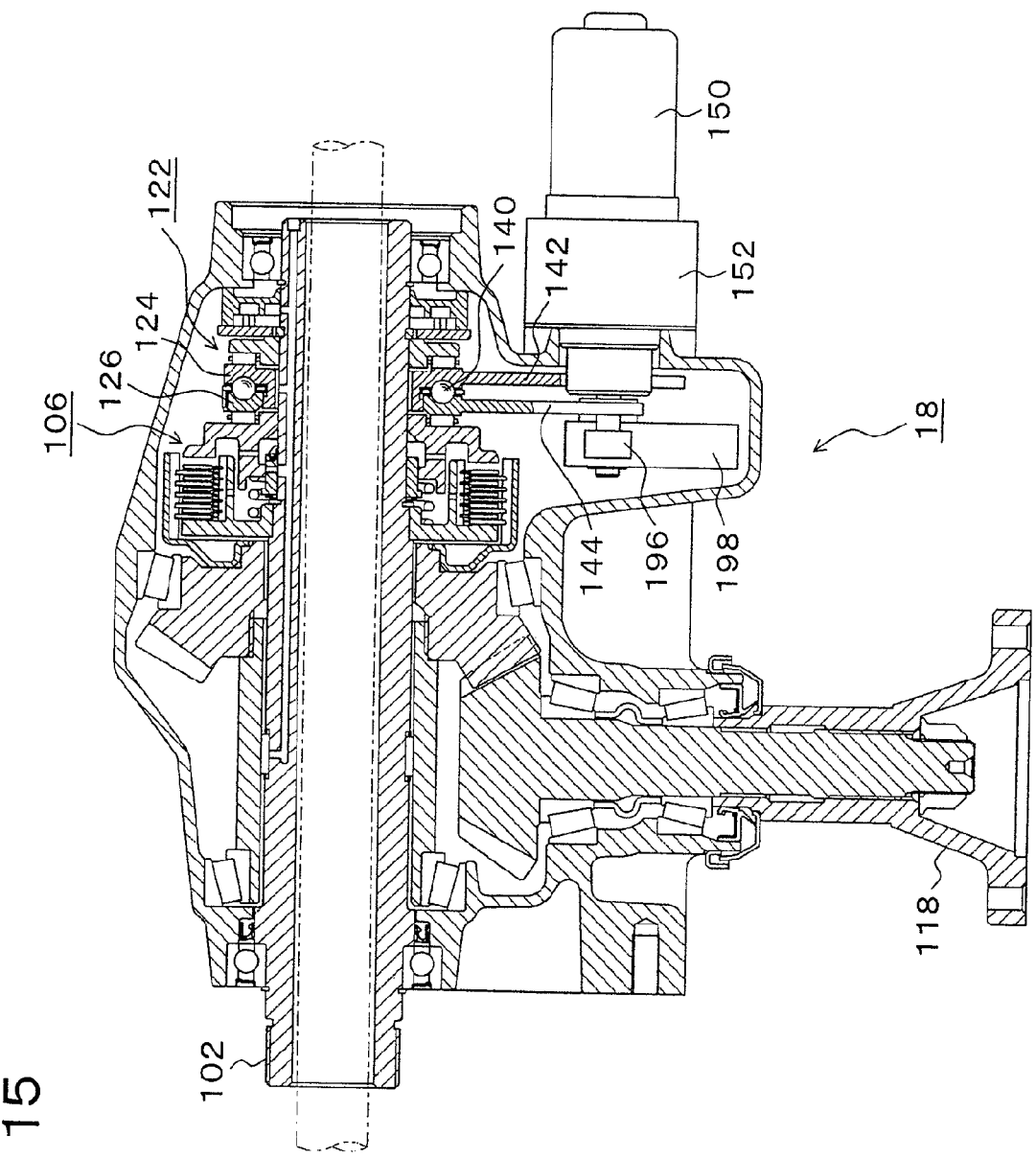
FIG. 15 is a cross sectional view showing another embodiment of the driving force distribution device in FIG. 13.

FIG. 15 is a cross sectional view showing another embodiments of the driving force distribution device 18 in FIG. 13, and the configuration thereof is same as that shown in FIGS. 5 and 6 except that a ball cam mechanism 122 is different. In FIG. 15, a servo motor 150 rotates a fringe cam 198 through a reduction gear 152. In the rotation cam plate 126, a cam follower 196 including a rotatable roller is provided on the end of an expanded arm unit 144, and the cam follower 196 contacts the external circumferential part of the fringe cam 198. When the rotation cam plate 126 is driven to rotate in the specified direction to the fixed cam plate 124 by the fringe cam 198, the ball cam mechanism 122 receives the press by the ball 140 sandwiched between the ball cam grooves 128 which are the inclined grooves of the facing surfaces and presses the press member 160 and a return spring 162 in the axial direction, and the press member 160 presses the clutch discs 120 of the multi-disc clutch mechanism 106, thereby the ball cam mechanism 122 increases the transmission torque depending on the rotation amount of the drive gear 148 and becomes direct connection state at the maximum press position.

Figure 16A:
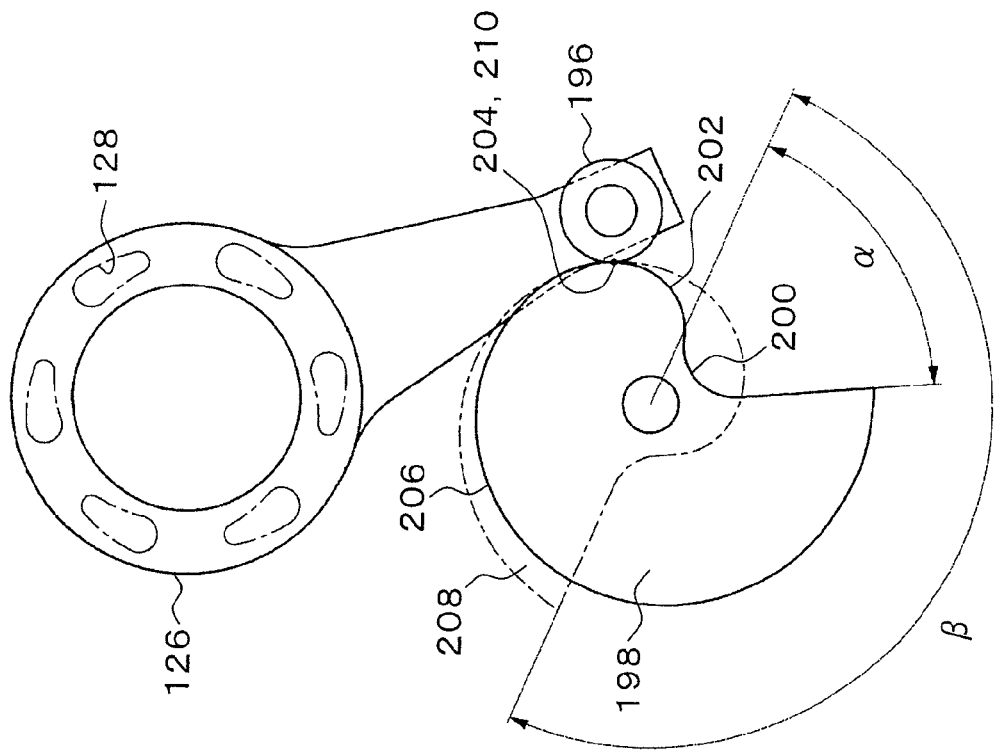
FIGS. 16A and 16B are explanatory diagrams showing the ball cam mechanism in FIG. 5 viewed from the axial direction.
Figure 16B:
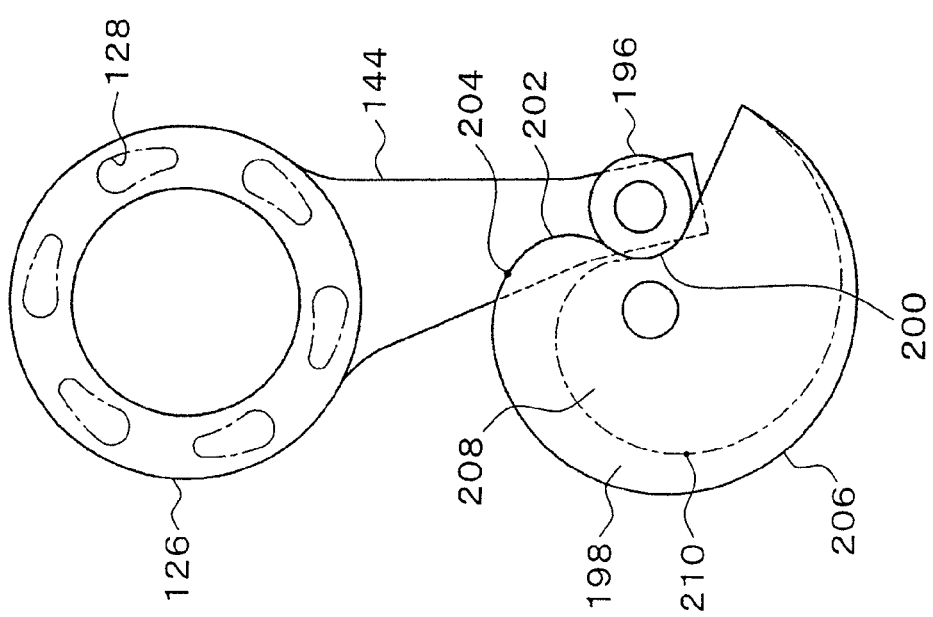

FIGS. 16A and 16B are explanatory diagrams showing the ball cam mechanism 122 in FIG. 15 viewed from the input shaft 102. In FIG. 14, the rotation cam plate 126 includes the ball cam grooves 128 in the circumferential direction. The ball cam grooves 128 in the present embodiment do not have a runover unit 134 as shown in FIGS. 14A to 14C in the embodiment of FIG. 5, and the inclined area 132 has a shape that goes without a step from the initial area 130. The external circumferential part of a cam follower 196 provided on the end of an arm unit 144 expanding from the rotation cam plate 126 contacts the cam surface of a fringe cam 198. The cam surface of the fringe cam 198 includes an initial area 200, a nonlinear area 1202 and a linear area 206, and rotates clockwise to drive and rotate the rotation cam plate 126 through the cam follower 196, and presses the multi-disc clutch mechanism 106.

FIG. 16A shows the state where the multi-disc clutch mechanism 106 is released in the two-wheel drive, and the press member 160 is at the standby position and the cam follower 196 is positioned in the initial area 200 of the cam surface of the fringe cam 198.

FIG. 16B shows the state where the press member 160 starts contacting the clutch disc 120 in the fastening initial state when the mode shifts from the two-wheel drive to the four-wheel drive, and the cam follower 196 is at the position shifting from the nonlinear area 202 to the linear area 206 of the cam surface of the fringe cam 198, and this point becomes the press start position 204. The press start position 204 of the fringe cam 198 may be at the nonlinear area 202 or the linear area 206 as long as it is near the position shifting from the nonlinear area 202 to the linear area 206, but it is preferable that the press start position is at a point shifting from the nonlinear area 202 to the linear area 206. Herein, the shape of the linear cam 1208 without the nonlinear area is shown as a prior-art example and compared with the fringe cam 198. In the linear cam 208, an angle β is required until the press member 160 reaches the press start position 210 to start pressing the clutch disc 120, meanwhile in the fringe cam 198 having the nonlinear area 202, the press member 160 reaches the press start position 204 by an angle a that is far smaller than the angle β.

Figure 17:
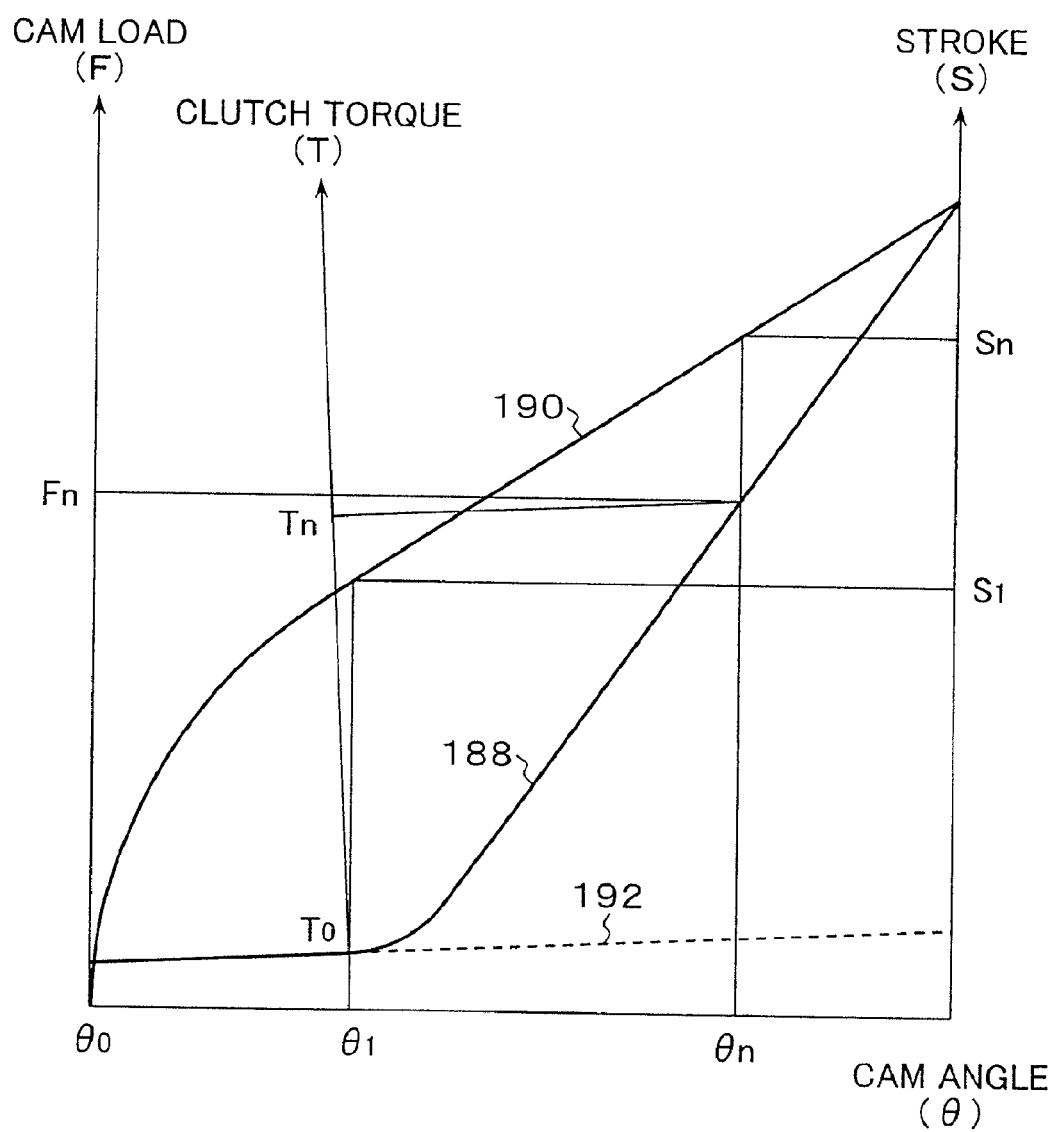
FIG. 17 is an explanatory diagram showing the movement of the ball cam mechanism shown in FIG. 15 and FIG. 16.
Figure 18:
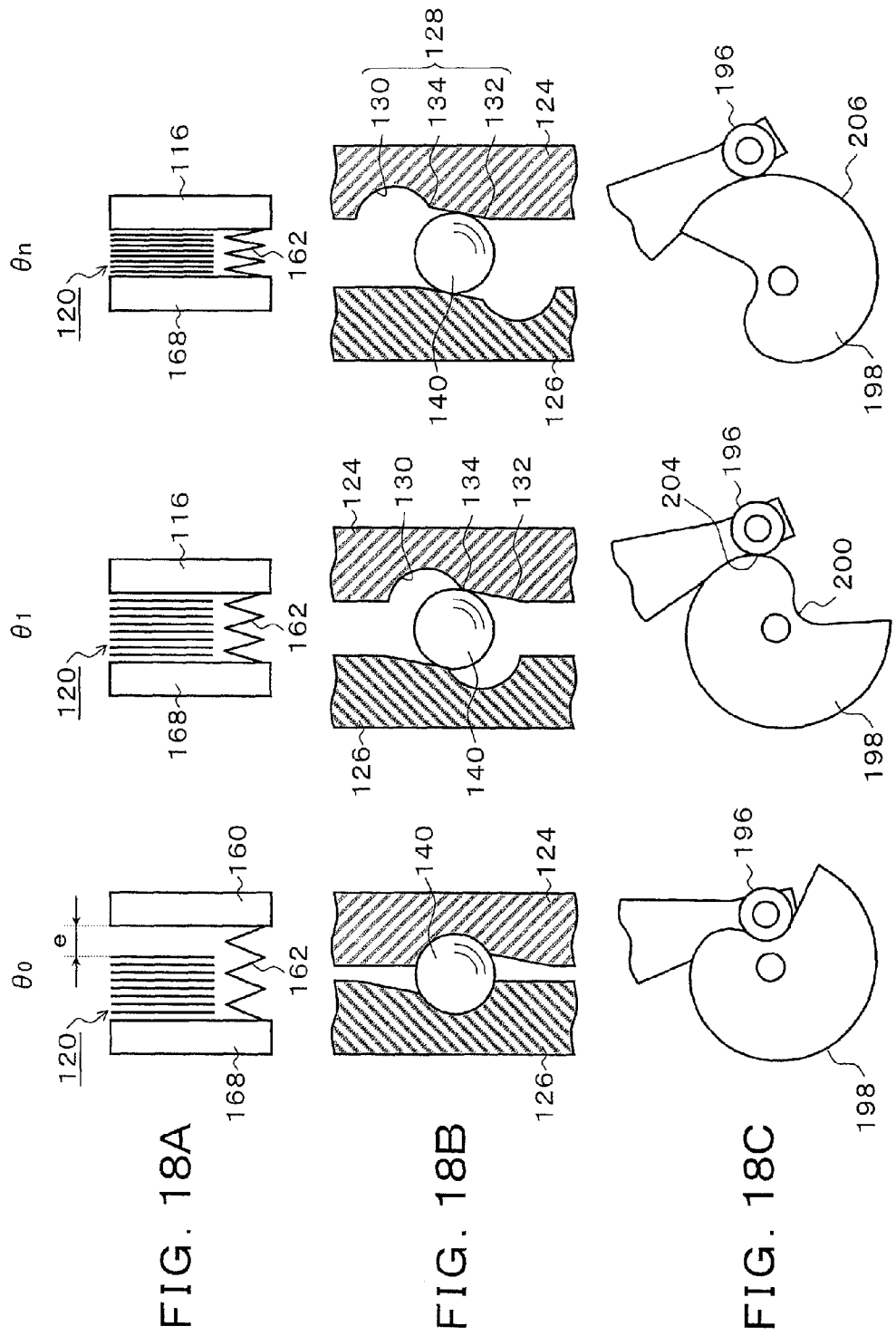
FIGS. 18A to 18C are explanatory diagrams showing the movement of the ball cam mechanism shown in FIG. 15 and FIG. 16.

FIGS. 17 and 18 are explanatory diagrams showing the movement of the ball cam mechanism 122 shown in FIGS. 14A to 14C and FIGS. 16A and 16B. FIG. 17 is a graph schematically showing the relation between the cam load 188 working to the press member 160 of the multi-disc clutch mechanism 106 and the stroke 190 of the press member 160, and the spring load 192, and the horizontal axis shows the cam angle (θ) of the rotation cam plate 126, and the vertical axis shows the cam load (F) and the stroke (S). The stroke 190 of the press member 160 shows a nonlinear area from the cam angle $\theta_0$ to $\theta_1$ and a linear area after the cam angle $\theta_1$ to $\theta_{max}$, and the axis of the clutch torque (T) includes its start point (T0) at the spring load 192 of the cam angle $\theta_1$, and is perpendicular to the inclination of the spring load 192.

FIG. 18A shows the states of the press member 160, the clutch drum 108, the clutch disc 120 and the return spring 162 corresponding to the cam angle θ shown in FIG. 17, and the states are the standby state $\theta_0$, fastening start $\theta_1$, and fastening state $\theta_n$ of the multi-disc clutch mechanism 106 respectively.

FIG. 18B shows the positional relations of the fixed cam plate 124, the rotation cam plate 126 and the ball 140 shown in FIGS. 14A to 14C corresponding to the cam angle θ, and the relations show, from the left to the right, the case where the ball 140 of the cam angle $\theta_0$ is at the initial area 130 of the ball cam grooves 128, the case where the ball 140 of the cam angle $\theta_1$ is at the position where the ball 140 of the cam angle $\theta_1$ finishing running over the runover units 134 of the ball cam grooves 128, and the state where the ball 140 of the cam angle $\theta_n$ is in the inclined area 132 of the ball cam grooves 128 respectively.

FIG. 18C shows the positional relations of the fringe cam 198 and the cam follower 196 positioned at the end of the arm unit 144 of the rotation cam plate 126 shown in FIGS. 16A and 16B corresponding to cam angle θ, and the relations show, from the left to the right, the case where the cam follower 196 of the cam angle $\theta_0$ is at the initial area 200 of the fringe cam 198, the case where the cam follower 196 of the cam angle $\theta_1$ is at the press start position 204 of the fringe cam 198, and the case where the cam follower 196 of the cam angle $\theta_n$ is at the linear area 206 of the fringe cam 198 respectively. In the multi-disc clutch mechanism 106, the movement of the press member 160 is made with a small load only as to press the return spring 162 from the standby position to the position to start contacting the clutch discs 120, but a high speed is necessary in order to take good shift response from the two-wheel drive to the four-wheel drive. The movement speed of this section becomes important in particular when the intervals among the clutch discs 120 are made large to prevent the dragging in the two-wheel drive, and the end play of the multi-disc clutch mechanism 106 is made large. In the standby state of the cam angle $\theta_0$, there is an end play of a distance e between the press member 160 and the clutch discs 120, and in the case of FIG. 18B, this distance e is quickly shortened in the nonlinear area where the ball 140 runs over the runover unit 134 of the ball cam grooves 128 from the cam angle $\theta_0$ to the cam angle $\theta_1$. In the case of FIG. 18C, the cam follower 196 quickly shorten this distance e by passing the nonlinear area 202 from the cam angle $\theta_0$ to the cam angle $\theta_1$ and moving to the press start position 1204. Because the cam load (F) in the section from the cam angle $\theta_0$ to the cam angle $\theta_1$ is only the spring load 192 of the return spring 162, it is possible to obtain a large stroke $S_1$ with the small cam angle $\theta_1$. Thereafter, when the press member 160 starts contacting and pressing the clutch disc 120, a clutch torque (T) occurs in the clutch discs 120, and the cam load (F) increases rapidly. After the cam angle $\theta_1$, the ball 140 is in the inclined areas 132 of the ball cam grooves 128, and the value obtained by subtracting the spring load 192 from the load Fn, in the stroke $S_n$ of the cam angle $\theta_n$, is equivalent to the clutch torque Tn.

Figure 19:
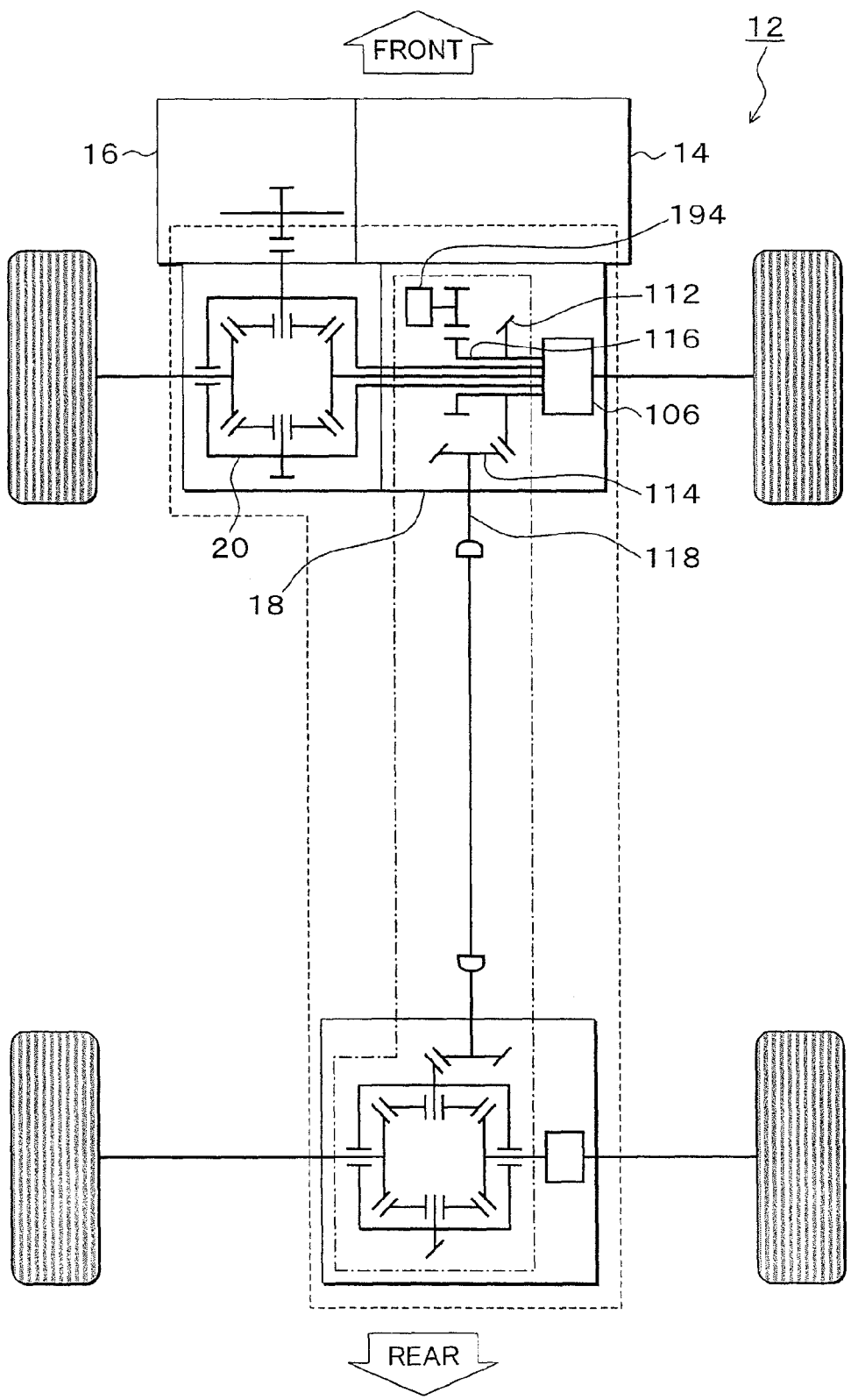
FIG. 19 is an explanatory diagram showing another embodiment of a driving force transmission device for four-wheel-drive vehicle according to the present invention.

FIG. 19 is an explanatory diagram showing another embodiment of a driving force transmission device for four-wheel-drive vehicle according to the present invention, and the configuration is same as that in the embodiment shown in FIG. 3 except for an oil pump 194. In FIG. 19, the oil pump 194 is connected to the bevel gear shaft 116, and when the multi-disc clutch mechanism 106 is fastened and the bevel gear 114 rotates, the oil pump 194 supplies the oil to the multi-disc clutch mechanism 106 through a hydraulic pressure circuit not shown to prevents the seizing owing to the frictional heat of the clutch discs in the multi-disc clutch mechanism 106. Meanwhile, in the present embodiment, the oil pump 194 is connected to the bevel gear shaft 116 and gets power therefrom, but it may get power from the portions to which the driving force is not transmitted in the two-wheel drive, for example, from the bevel gear 112 or the output pinion 114.

Figure 20:
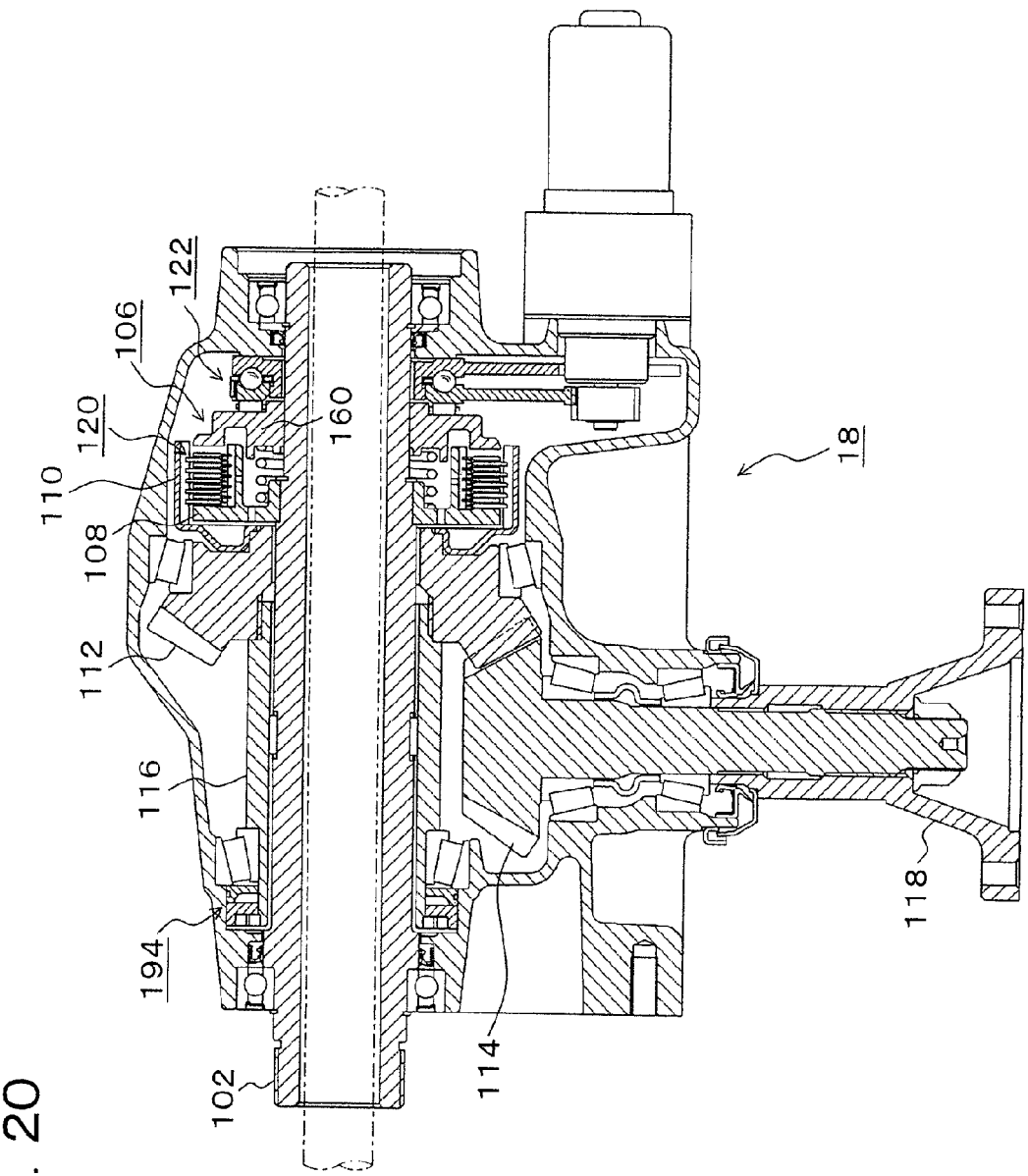
FIG. 20 is a cross sectional view showing an embodiment of the driving force distribution device in FIG. 19.

FIG. 20 is a cross sectional view showing an embodiment of the driving force distribution device 18 in FIG. 19, and the configuration is same as that of the embodiment shown in FIG. 5 except that there is not the oil pump 184 driven by the input shaft 102, and instead, there is the oil pump 194 driven by the bevel gear shaft 116, and there is not the oil hole opening/closing unit 164 and the oil path 186 whose details are shown in FIG. 6.

In FIG. 20, the oil pump 194 is provided in the opposite side of the bevel gear 112 of the bevel gear shaft 116, and gets power from the bevel gear shaft 116 to supplies the oil to the multi-disc clutch mechanism 106 through the part between the external circumferential part of the input shaft 102 and the inner circumferential part of the bevel gear shaft 116, and the part between the external circumferential part of the input shaft 102 and the inner circumferential part of the bevel gear 112. In such a configuration, when the multi-disc clutch mechanism 106 is released in the two-wheel drive, and the press member 160 is at standby position most away from the clutch discs 120, the clutch discs engaged with the clutch drum 110 among the clutch discs 120 do not rotate, but the clutch discs engaged with the clutch hub 108 rotate in conjunction with the rotation of the input shaft 102. However, since the clutch drum 110 does not rotate, the bevel gear 012 and the bevel gear shaft 116 do not rotate, and the oil pump 194 does not discharge the oil, the oil is not supplied to the clutch discs 120, and the viscosity resistance by the oil is reduced, thereby it is possible to prevent the dragging at the side of the clutch drum 110. In the state where the mode is changed from the two-wheel drive to the four-wheel drive, the press member 160 which is pressed by the ball cam mechanism 122 and moves to the left side presses the clutch discs 120, and the clutch discs 120 are contacted one another, since the clutch drum 110 rotates, the bevel gear shaft 116 rotates through the bevel gear 112. Therefore, the oil pump 194 driven by the bevel gear shaft 116 discharges the oil, and the oil is supplied to the clutch discs 120 to prevents the clutch discs from being seized one another.

Figure 21:
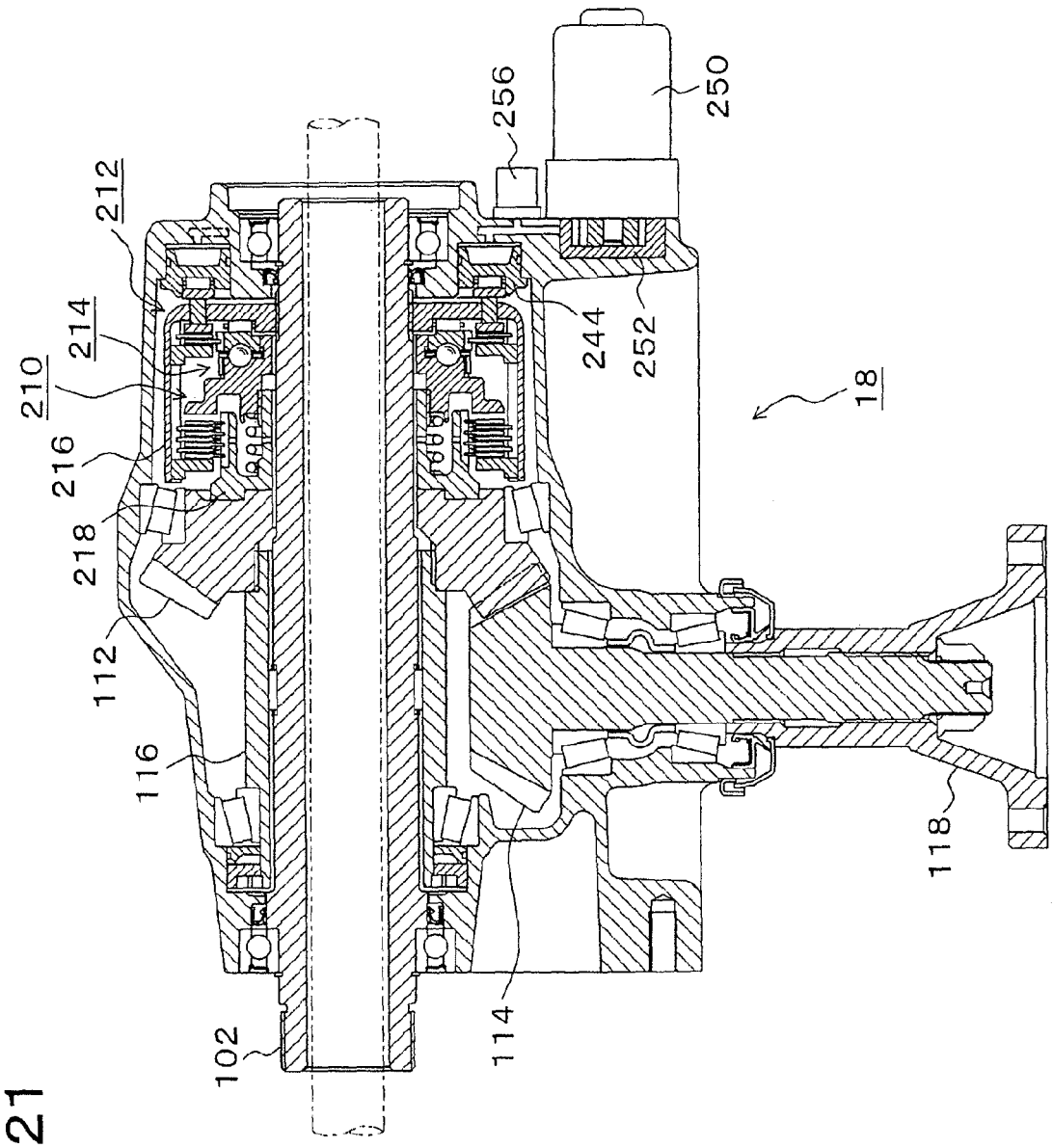
FIG. 21 is an explanatory diagram showing still another embodiment of a driving force transmission device for four-wheel-drive vehicle according to the present invention.

FIG. 21 is a cross sectional view showing still another embodiment of a driving force transmission device for four-wheel-drive vehicle according to the present invention. The embodiment in FIG. 21 substantially shows a driving force distribution device 18 in FIG. 19, and the configuration is same as that of the cross sectional view shown in FIG. 20 except that a primary clutch 212, a multi-disc clutch mechanism 210 including a ball cam mechanism mechanic 214, an oil hydraulic piston 244, a hydraulic pump 252, and pressure sensor 256 are different.

In FIG. 21, the multi-disc clutch mechanism 210, the primary clutch 212, the ball cam mechanism 214 are provided coaxially with the input shaft 102, and the multi-disc clutch mechanism 210 fixes a clutch drum 216 to the input shaft 102, and a clutch hub 218 is connected to a bevel gear 112 rotatably provided to the bevel gear shaft 116 to the input shaft 102. In such a driving force distribution device 18, in the two-wheel drive, the connection between the clutch drum 216 of the multi-disc clutch mechanism 210 and the clutch hub 218 is released, and the driving force of the input shaft 102 is not transmitted to the rear wheel output shaft 118. In the four-wheel drive, the multi-disc clutch mechanism 210 is fastened, and the driving force from the input shaft 102 is transmitted also transmitted to the rear wheel output shaft 118 through the multi-disc clutch mechanism 210, the bevel gear 112, and the output pinion 114.

Figure 22:
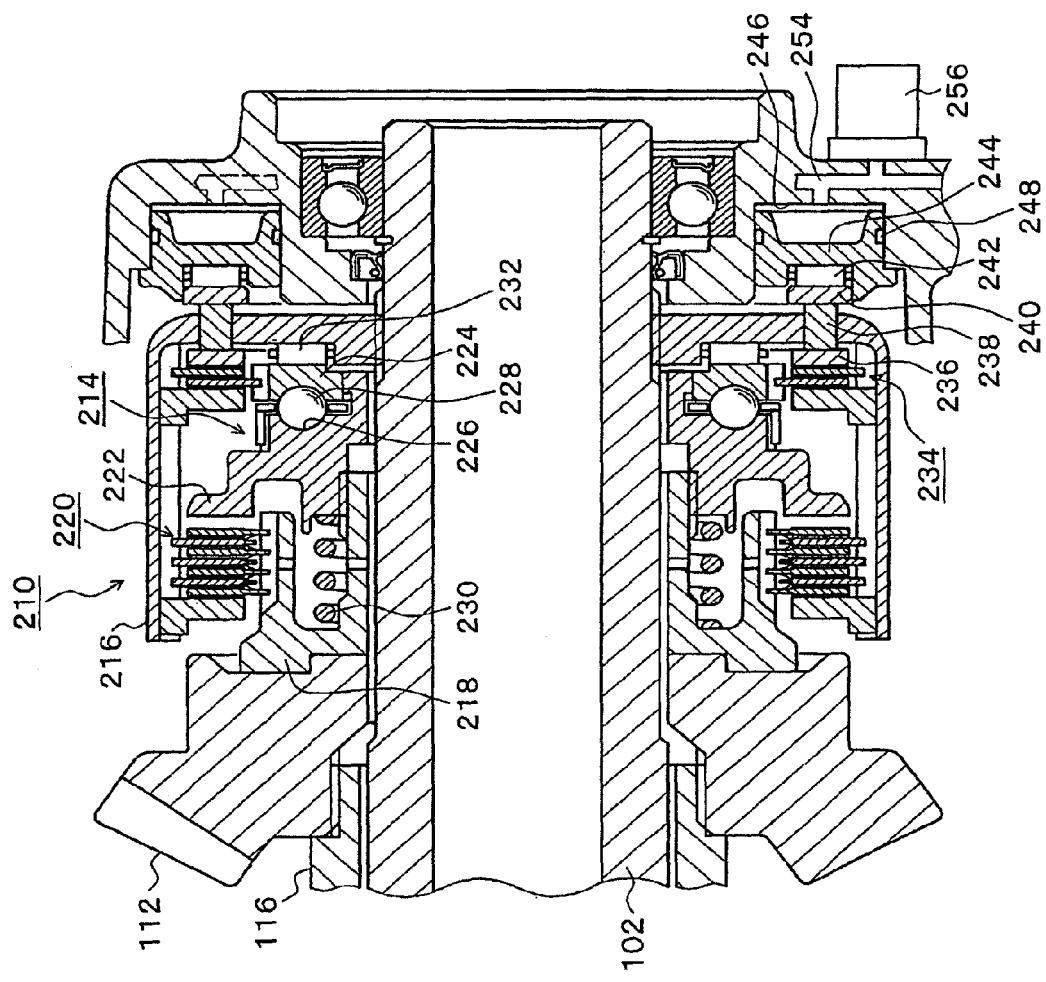
FIG. 22 is a cross sectional view showing the primary clutch and the ball cam mechanism shown in FIG. 21.

FIG. 22 is a cross sectional view showing the multi-disc clutch mechanism 210, the primary clutch 212 and the cam mechanism 214. In FIG. 22, to the multi-disc clutch mechanism 210, a ball cam mechanism 214 to control the fastening power of the clutch discs 220 provided between the clutch drum 216 and the clutch hub 218 and a primary clutch 212 for driving the ball cam mechanism 214 are provided. The ball cam mechanism 214 sandwiches and retains a ball 228 in ball cam grooves 226 of the cam surfaces of a pair of a press member 222 and a cam plate 224 provided relatively rotatably and coaxially with the input shaft 102. The press member 222 is urged to the releasing direction of the multi-disc clutch mechanism 210 by a return spring 230 rotates together with the clutch hub 218 and provided between the clutch hub 218 and the press member. Between the cam plate 224 and the clutch drum 216, a thrust bearing 232 is provided. The primary clutch 212 includes a clutch disc 234 between the clutch drum 216 and the cam plate 224, and transmits the rotation of the clutch drum 216 to the cam plate 224 when a press disc 236 presses and fastens the clutch disc 234. The press disc 236 connects with a pressure receive disc 240 through a press shaft 238 penetrate through the clutch drum 216, and the pressure receive disc 240 is engaged with a hydraulic piston 244 through a thrust bearing 242. The hydraulic piston 244 can move between the position to release the primary clutch 212 and the position to fasten the same in a cylinder 246, and is sealed with an O-ring 248.

As shown in FIG. 21, the servo motor 250 drives a hydraulic pump 252, and the oil discharged from the hydraulic pump 252 flows into a cylinder 246 through an oil path 254, thereby the hydraulic piston 244 presses the clutch disc 234 through the thrust bearing 242, the pressure receive disc 240, the press shaft 238, and the press disc 236, and fastens the primary clutch 212. In the oil path 254, a hydraulic sensor 256 is provided and detects the hydraulic pressure of the hydraulic cylinder 246. A hydraulic pressure controlling unit not shown monitors the hydraulic pressure detected by the hydraulic sensor 256 and controls the hydraulic piston 244 to an appropriate movement amount. When the cam plate 224 is driven to rotate in a specified direction to the press member 222 by the primary clutch 212, the ball cam mechanism 214 receives the press by the ball 228 sandwiched between the ball cam grooves 226 which are the inclined grooves of the facing surfaces and presses the press member 222 and a return spring 230 in the axial direction, and the press member 222 presses the clutch discs 220 of the multi-disc clutch mechanism 210, thereby the ball cam mechanism 214 increases the transmission torque depending on the movement amount of the hydraulic piston 244 and becomes direct connection state at the maximum press position. By the configuration having the primary clutch 212 as mentioned above, it is possible to reduce the number of the clutch discs 220 and to decrease the dragging torque of the multi-disc clutch mechanism 210. By making the dragging torque smaller than the friction torque of the rear wheel driving force transmission section, it is possible to stop the rotation of the structural elements in the rear wheel driving force transmission section to decrease the oil viscosity resistance and the friction loss in this section, and prevent the mileage from decreasing.

The present invention is not limited to the embodiment mentioned above, but includes an arbitrary modification not impair the object and advantage thereof, and further the present invention is not limited to the values indicated in the above embodiments.

What is claimed is:

1. A driving force transmission device for a four-wheel-drive vehicle, the driving force transmission device comprising:
   a switch mechanism for switching between a four-wheel-drive mode in which a fastening power of a multi-disc clutch mechanism is changed continually and a driving force distribution transmitted to front and rear wheels is automatically controlled depending on running conditions, and a two-wheel-drive mode in which the multi-disc clutch mechanism is released and the driving force distribution is transmitted only to the front wheels;
   a front wheel differential that receives a driving force from a power source and outputs the driving force to left and right front wheel drive shafts and the multi-disc clutch mechanism;
   a propeller shaft that transmits the driving force distributed by the multi-disc clutch mechanism;
   a rear wheel differential that receives the driving force from the propeller shaft and outputs the driving force to left and right rear wheel drive shafts; and
   a disconnection/connection mechanism that disconnects and connects the rear wheel differential and one or both of the left and right rear wheel drive shafts, wherein
   a dragging torque of the multi-disc clutch mechanism is made smaller than a rotation resistance of a rear wheel driving force transmission section from the multi-disc clutch mechanism to the disconnection/connection mechanism in the two-wheel-drive mode, and the rear wheel differential and one or both of the left and right rear wheel drive shafts are disconnected by the disconnection/connection mechanism and thereby a rotation of the rear wheel driving force transmission section is stopped.

2. The driving force transmission device for the four-wheel-drive vehicle according to claim 1, wherein the multi-disc clutch mechanism includes:
   a plurality of clutch discs that can be displaced in an axial direction of the multi-disc clutch mechanism; and
   a lubricating oil supply amount change mechanism that controls a supply amount of lubricating oil to the clutch discs, and
   a supply of the lubricating oil to the clutch discs is stopped or limited to a specified amount at a time when the multi-disc clutch mechanism is released, and a distance of intervals among the clutch discs is above a specified value to make the dragging torque by the lubricating oil of the multi-disc clutch mechanism smaller than the rotation resistance of the rear wheel driving force transmission section.

3. The driving force transmission device for the four-wheel-drive vehicle according to claim 2, wherein the multi-disc clutch mechanism includes spacers that urge in a direction to widen the intervals among the clutch discs.

4. The driving force transmission device for the four-wheel-drive vehicle according to claim 3, wherein each of the spacers is a plate spring member including:
   a sandwiching unit to be inserted into a concave unit in a disc thickness direction provided in an edge of a respective one of the clutch discs; and
   an elastic piece that expands from the sandwiching unit to a radial direction of both surfaces of the respective one of the clutch discs and is deformable in an axial direction of the clutch discs.

5. The driving force transmission device for the four-wheel-drive vehicle according to claim 4, wherein each of the spacers is provided at an internal circumferential part of the respective one of the clutch discs.

6. The driving force transmission device for the four-wheel-drive vehicle according to claim 4, wherein the elastic piece of each of the spacers is opened in an external circumferential direction of the respective one of the clutch discs.

7. The driving force transmission device for the four-wheel-drive vehicle according to claim 4, wherein the lubricating oil supply amount change mechanism includes:
   an oil pump that is driven in conjunction with an output to the front wheels and supplies the lubricating oil to the clutch discs;
   a press member that moves in the axial direction of the clutch disks to fasten and release the clutch discs; and
   an oil hole opening/closing unit that opens and closes an oil hole to supply the lubricating oil to the clutch discs in conjunction with the press member to control the supply amount of the lubricating oil, and
   the oil hole opening/closing unit closes the oil hole at a position where the clutch discs are released, and opens the oil hole at a position where the clutch discs are fastened.

8. The driving force transmission device for the four-wheel-drive vehicle according to claim 7, wherein the oil hole opening/closing unit includes an oil hole position adjustment member that changes positions of the oil hole to supply the lubricating oil to the clutch discs in conjunction with a movement limit in a fastening direction of the press member which changes depending on an abrasion state of the clutch discs.

9. The driving force transmission device for the four-wheel-drive vehicle according to claim 2, wherein the lubricating oil supply amount change mechanism includes an oil pump that is driven in conjunction with the rear wheel driving force transmission section and supplies the lubricating oil to the clutch discs in the four-wheel-drive mode.

10. The driving force transmission device for the four-wheel-drive vehicle according to claim 2, wherein the multi-disc clutch mechanism further includes:
    a press member that moves in an axial direction of the clutch discs to fasten and release the clutch discs;
    a drive source that outputs a rotation power to move the press member; and
    a press mechanism that converts and amplifies the rotation power from the drive source to a fastening direction of the press member, and
    a conversion rate of an axial direction displacement of the press member to a rotation angle of the drive source is higher in a shift section where the press member moves from a standby position in a releasing direction to a fastening start position in the fastening direction than in a press section where fastening power is changed continually from the fastening start position to a fastening end position in the fastening direction.

11. The driving force transmission device for the four-wheel-drive vehicle according to claim 10, wherein the press member includes a ball cam mechanism in which a plurality of ball cam grooves expanding in a circumferential direction on facing surfaces of a fixed cam plate and a rotation cam plate provided coaxially with the press mechanism are provided and balls are sandwiched between the ball cam grooves, and the ball cam grooves include:
    a nonlinear area to move the press member in the shift section; and
    a linear area to move the press member in the press section, and
    a displacement in an axial direction to a rotation angle of the rotation cam plate is larger in the nonlinear area than in the linear area.

12. The driving force transmission device for the four-wheel-drive vehicle according to claim 11, wherein the ball cam mechanism includes a retainer that retains relative positions of the respective balls provided in the circumferential direction.

13. The driving force transmission device for the four-wheel-drive vehicle according to claim 11, wherein the retainer includes a positioning unit to regulate initial positions of the balls to the ball cam grooves.

14. The driving force transmission device for the four-wheel-drive vehicle according to claim 10, wherein the press mechanism includes:
    a rotation cam plate that is provided coaxially with the press member to convert a rotation displacement into an axial direction displacement;
    a fringe cam that has a cam surface in an external circumferential direction and is driven to rotate by the drive source; and
    a cam follower to be engaged with the fringe cam at an end of an arm unit expanding from the rotation cam plate,
    the cam surface includes:
    a nonlinear area to move the press member in the shift section, and
    a linear area to move the press member in the press section, and
    a normal direction displacement of the cam follower to a rotation angle of the fringe cam is larger in the nonlinear area than in the linear area.

15. The driving force transmission device for the four-wheel-drive vehicle according to claim 2, wherein the multi-disc clutch mechanism further includes:

a press member for moving in an axial direction of the clutch discs to fasten and release the clutch discs;
a primary clutch in conjunction with an output to the front wheels;
an actuator for moving in the axial direction of the clutch discs to fasten and release the primary clutch; and
a press mechanism that converts and amplifies a rotation power from the primary clutch to a fastening direction of the press member.

* * * * *